United States Patent
Wang et al.

(10) Patent No.: US 10,891,537 B2
(45) Date of Patent: Jan. 12, 2021

(54) CONVOLUTIONAL NEURAL NETWORK-BASED IMAGE PROCESSING METHOD AND IMAGE PROCESSING APPARATUS

(71) Applicant: HUAWEI TECHNOLOGIES CO., LTD., Guangdong (CN)

(72) Inventors: Yunhe Wang, Beijing (CN); Chunjing Xu, Shenzhen (CN); Kai Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 16/359,346

(22) Filed: Mar. 20, 2019

(65) Prior Publication Data

US 2020/0302265 A1    Sep. 24, 2020

(51) Int. Cl.
  *G06N 3/04*    (2006.01)
  *G06F 17/15*    (2006.01)
  *G06F 17/16*    (2006.01)

(52) U.S. Cl.
  CPC .............. *G06N 3/04* (2013.01); *G06F 17/15* (2013.01); *G06F 17/16* (2013.01)

(58) Field of Classification Search
  CPC .......... G06N 3/04; G06N 20/10; G06F 17/15; G06F 17/16
  USPC ....................................................... 382/156
  See application file for complete search history.

(56) References Cited

U.S. PATENT DOCUMENTS

| | | |
|---|---|---|
| 2010/0215253 A1 | 8/2010 | Yamamoto et al. |
| 2016/0358068 A1 | 12/2016 | Brothers et al. |
| 2018/0137406 A1 | 5/2018 | Howard et al. |
| 2019/0163716 A1 | 5/2019 | Li et al. |

FOREIGN PATENT DOCUMENTS

| | | |
|---|---|---|
| CN | 106228556 A | 12/2016 |
| CN | 107729994 A | 2/2018 |
| CN | 107944545 A | 4/2018 |
| CN | 107967459 A | 4/2018 |

OTHER PUBLICATIONS

Wang et al., "Learning Versatile Filters for Efficient Convolutional Neural Networks," 32nd Conference on Neural Information Processing Systems (NIPS), Dec. 2018, 11 pages.

(Continued)

*Primary Examiner* — Daniel G Mariam
(74) *Attorney, Agent, or Firm* — Leydig, Voit & Mayer, Ltd.

(57) ABSTRACT

This application discloses a convolutional neural network-based image processing method and image processing apparatus in the artificial intelligence field. The method may include: receiving an input image; preprocessing the input image to obtain preprocessed image information; and performing convolution on the image information using a convolutional neural network, and outputting a convolution result. In embodiments of this application, the image processing apparatus may store primary convolution kernels of convolution layers, and before performing convolution using the convolution layers, generate secondary convolution kernels using the primary convolution kernels of the convolution layers.

12 Claims, 9 Drawing Sheets

(56) References Cited

OTHER PUBLICATIONS

Han et al., "Deep compression: Compressing deep neural networks with pruning, trained quantization and huffman coding," International Conference on Learning Representations (ICLR), 2016, 14 pages.
Wen et al., "Learning Structured Sparsity in Deep Neural Networks," 30th Conference on Neural Information Processing Systems (NIPS), Dec. 2016, 9 pages.
Rastegari et al., "XNOR-Net: ImageNet Classification Using Binary Convolutional Neural Networks," arXiv:1603.05279v4 [cs.CV], Aug. 2, 2016, 17 pages.
Xie et al., "Aggregated Residual Transformations for Deep Neural Networks," arXiv:1611.05431v2 [cs.CV], Apr. 11, 2017, 10 pages.
Howard et al., "MobileNets: Efficient Convolutional Neural Networks for Mobile Vision Applications," arXiv:1704.04861v1 [cs.CV], Apr. 17, 2017, 9 pages.
Zhang et al., "ShuffleNet: An Extremely Efficient Convolutional Neural Network for Mobile Devices," arXiv:1707.01083v2 [cs.CV], Dec. 7, 2017, 9 pages.
Cheng Yu et al., "Model Compression and Acceleration for Deep Neural Networks: The Principles, Progress, and Challenges," XP011675813, IEEE Signal Processing Magazine, IEEE Service Center, Piscataway, NJ, US, vol. 35, No. 1, pp. 126-136 (Jan. 2018).
Minnehan et al., "Cascaded Projection: End-to-End Network Compression and Acceleration," XP081132621, arXiv:1903.04988v1 [cs.CV], total 10 ppages (Mar. 12, 2019).

FIG. 7

CONVOLUTIONAL NEURAL NETWORK-BASED IMAGE PROCESSING METHOD AND IMAGE PROCESSING APPARATUS

TECHNICAL FIELD

This application relates to the computer vision field, and in particular, to an image processing method and an image processing apparatus.

BACKGROUND

Computer vision is an integral part of various intelligent systems in various application fields, for example, fields such as a manufacturing industry, inspection, document analysis, medical diagnosis, and militaries. The computer vision is knowledge about how to use a camera or video camera and a computer to obtain required data and information of a photographed subject. To be vivid, eyes (the camera or video camera) and a brain (an algorithm) are mounted on the computer to identify, track, and measure a target, and the like in replacement of human eyes, so that the computer can perceive an environment. The perceiving may be considered as extracting information from a perceptual signal. Therefore, the computer vision may also be considered as a science of studying how to make an artificial system perform "perceiving" from an image or multi-dimensional data. To sum up, the computer vision is to replace a visual organ with various imaging systems to obtain input information, and then replace a brain with a computer to process and interpret the input information. A final study objective of the computer vision is to make a computer observe and understand the world through vision in a way that human beings do, and have a capability of automatically adapting to an environment.

Benefiting from rapid development of a graphics processing unit (GPU) and various neural network processors, a convolutional neural network (CNN) has become an indispensable technology in the computer vision field. At present, a mobile device (for example, a mobile phone, a camera, or a smart household) has a lot of application requirements, for example, image recognition and target detection, for the CNN. Currently, a parameter amount of convolution kernels at each convolution layer in a common CNN usually can reach tens of thousands and even hundreds of thousands. A total quantity of parameters (parameters of convolution kernels) participating in a convolution operation in the entire CNN can reach tens of millions. If all parameters in the CNN are stored, a memory space of hundreds of megabytes needs to be occupied. However, memory resources in the mobile device are quite limited. Therefore, how to reduce a memory space occupied by the CNN is a problem to be urgently resolved.

SUMMARY

Embodiments of this application provide a convolutional neural network-based image processing method and image processing apparatus, so as to effectively reduce memory occupied by a convolutional neural network.

According to a first aspect, an embodiment of this application provides a convolutional neural network-based image processing method, where the method includes: receiving an input image; preprocessing the input image, to obtain preprocessed image information; performing convolution on the image information by using a convolutional neural network, where the convolutional neural network includes N convolution layers, and the convolution includes: performing a convolution operation on the image information by using M convolution kernels at an $n^{th}$ convolution layer, where the M convolution kernels include m primary convolution kernels and r secondary convolution kernels, the r secondary convolution kernels are obtained based on the m primary convolution kernels, one or more secondary convolution kernels are correspondingly obtained based on one primary convolution kernel, a quantity of non-zero elements included in each of the r secondary convolution kernels is less than a quantity of non-zero elements included in a primary convolution kernel corresponding to the secondary convolution kernel, both N and M are integers greater than 0, n is an integer greater than 0 and less than or equal to N, m is an integer greater than 0 and less than M, and r is an integer greater than 0 and less than M; and outputting a convolution result, where the convolution result includes M feature graphs.

The image processing method is performed by an image processing apparatus. The image processing apparatus may be a mobile phone, a tablet computer, a notebook computer, a game console, a server, a wearable device, or the like. Optionally, a secondary convolution kernel is obtained based on some elements in a primary convolution kernel, in other words, all elements in the secondary convolution kernel come from the primary convolution kernel. A quantity of elements included in a secondary convolution kernel obtained in this manner is less than a quantity of elements included in a primary convolution kernel corresponding to the secondary convolution kernel. Optionally, a secondary convolution kernel is obtained by setting some elements in a primary convolution kernel to 0. A quantity of non-zero elements included in a secondary convolution kernel obtained in this manner is less than a quantity of non-zero elements included in a primary convolution kernel corresponding to the secondary convolution kernel.

The image processing apparatus may store a primary convolution kernel of each convolution layer in the convolutional neural network, and before performing a convolution operation by using each convolution layer, generate, based on the primary convolution kernel of the convolution layer, a plurality of secondary convolution kernels corresponding to the convolution layer, and perform, based on the primary convolution kernel and the plurality of generated secondary convolution kernels, a convolution operation on input image information of the convolution layer. For example, a convolution layer in the convolutional neural network can use six convolution kernels when performing a convolution operation. The image processing apparatus may store only one primary convolution kernel of the convolution layer. Before performing a convolution operation at the convolution layer, the image processing apparatus generates six secondary convolution kernels based on the primary convolution kernel, and performs a convolution operation on input image information by using the six secondary convolution kernels.

In this embodiment of this application, the image processing apparatus may store primary convolution kernels of convolution layers first, and before performing convolution by using the convolution layers, generate, by using the primary convolution kernels of the convolution layers, secondary convolution kernels required by the convolution layers. This can reduce memory occupied by the convolutional neural network.

In an optional implementation, any one of the r secondary convolution kernels includes P channels; a primary convolution kernel corresponding to the any secondary convolution kernel includes P channels; a two-dimensional matrix, on a $p^{th}$ channel, of the any secondary convolution kernel includes a sub-matrix of a two-dimensional matrix, on a $p^{th}$ channel, of the primary convolution kernel corresponding to the any secondary convolution kernel; P is an integer greater than 0; and p is an integer greater than 0 and not greater than P.

A matrix is a set of complex numbers or real numbers arranged based on a rectangular array. For example, an H-row and W-column numerical table obtained through arrangement of (H×W) numbers is referred to as an H-row and W-column two-dimensional matrix, an (H×W) matrix for short. The (H×W) numbers are referred to as elements of the matrix. A new matrix including elements in cross locations of some rows and some columns selected from a matrix is referred to as a sub-matrix of the original matrix. It may be understood that all elements, in a two-dimensional matrix on each channel, of any secondary convolution kernel come from a primary convolution kernel corresponding to the any secondary convolution kernel. In other words, all elements included in the any secondary convolution kernel come from the primary convolution kernel corresponding to the any secondary convolution kernel.

In this implementation, the image processing apparatus obtains a two-dimensional matrix, on a $p^{th}$ channel, of a secondary convolution kernel based on a sub-matrix of a two-dimensional matrix, on a $p^{th}$ channel, of a primary convolution kernel. The secondary convolution kernel can be quickly obtained based on the primary convolution kernel. Implementation is simple.

In an optional implementation, an element included in the two-dimensional matrix, on the $p^{th}$ channel, of the any secondary convolution kernel is an element other than elements in outermost K rows and outermost K columns in the two-dimensional matrix, on the $p^{th}$ channel, of the primary convolution kernel corresponding to the any secondary convolution kernel; and K is an integer not less than 1.

In this implementation, the image processing apparatus uses, as a secondary convolution kernel, a matrix corresponding to an element other than elements in outermost K rows and outermost K columns of a primary convolution kernel. The secondary convolution kernel with a size smaller than that of the primary convolution kernel can be quickly generated.

In an optional implementation, any secondary convolution kernel includes a two-dimensional matrix on P contiguous channels of Q channels included in a primary convolution kernel corresponding to the any secondary convolution kernel, and P is less than Q.

Optionally, any secondary convolution kernel includes a two-dimensional matrix on any P channels of Q channels included in a primary convolution kernel corresponding to the any secondary convolution kernel. The image processing apparatus may obtain the any secondary convolution kernel based on the two-dimensional matrix on the any P channels of the Q channels included in the primary convolution kernel corresponding to the any secondary convolution kernel.

In this implementation, the image processing apparatus can quickly generate a secondary convolution kernel with a size smaller than that of a primary convolution kernel.

In an optional implementation, any secondary convolution kernel is obtained by setting, to a target value, at least one element in a primary convolution kernel corresponding to the any secondary convolution kernel.

The target value may be 0, or may be another value. This is not limited in this application.

In this implementation, a secondary convolution kernel different from a primary convolution kernel can be quickly generated by setting at least one element in the primary convolution kernel to a target value. Implementation is simple.

In an optional implementation, any secondary convolution kernel is obtained by setting, to a target value, an element in a target location in a two-dimensional matrix on each channel of a primary convolution kernel corresponding to the any secondary convolution kernel.

An element in a target location in a two-dimensional matrix may be an element other than elements in outermost K rows and outermost K columns in the two-dimensional matrix. K is an integer not less than 1.

In this implementation, a secondary convolution kernel having a relatively large difference from a primary convolution kernel can be quickly obtained. Implementation is simple.

In an optional implementation, any secondary convolution kernel is obtained by setting, to a target value, all elements in a two-dimensional matrix on one or more channels of a primary convolution kernel corresponding to the any secondary convolution kernel.

In this implementation, a secondary convolution kernel including some elements of a primary convolution kernel can be quickly generated by setting, to a target value, all elements in a two-dimensional matrix on any channel of the primary convolution kernel.

In an optional implementation, any secondary convolution kernel is obtained by setting, to a zero matrix, a two-dimensional matrix on at least one channel of a primary convolution kernel corresponding to the any secondary convolution kernel. The zero matrix is a matrix in which all elements are 0.

In this implementation, a secondary convolution kernel is obtained by setting, to a zero matrix, a two-dimensional matrix on at least one channel of a primary convolution kernel. Performing a convolution operation by using the secondary convolution kernel can greatly reduce a quantity of times of floating-point calculation that needs to be performed.

In an optional implementation, any secondary convolution kernel is a matrix obtained by calculating a product of an element in a location in a sampling matrix and an element in a corresponding location in a primary convolution kernel corresponding to the any secondary convolution kernel. The sampling matrix and the primary convolution kernel corresponding to the any secondary convolution kernel are homotypic matrices, and elements in all locations in the sampling matrix are in a one-to-one correspondence with elements in all locations in the primary convolution kernel. An element in a target location in the sampling matrix is 1, and all elements in locations other than the target location are 0.

The element in the target location in the sampling matrix may be an element other than elements in outermost K rows and outermost K columns in each two-dimensional matrix of the sampling matrix in a channel dimension. K is an integer not less than 1.

In this implementation, a secondary convolution kernel is obtained by calculating a product of a primary convolution kernel and a sampling matrix. Implementation is simple.

In an optional implementation, any secondary convolution kernel is a matrix obtained by calculating a product of an element in a location in a sampling matrix and an element in a corresponding location in a primary convolution kernel corresponding to the any secondary convolution kernel. In a channel dimension, the sampling matrix includes (Q−P) zero matrices and P two-dimensional matrices in which all included elements are 1. The sampling matrix and the primary convolution kernel corresponding to the any secondary convolution kernel are homotypic matrices, and elements in all locations in the sampling matrix are in a one-to-one correspondence with elements in all locations in the primary convolution kernel. Q is an integer greater than 0. P is an integer greater than 0 and not greater than Q.

In this implementation, a secondary convolution kernel is obtained by calculating a product of a primary convolution kernel and a sampling matrix. Implementation is simple.

In an optional implementation, the image processing method further includes: obtaining a new secondary convolution kernel by using any one of the r secondary convolution kernels as a primary convolution kernel.

In this implementation, a generated secondary convolution kernel is used as a new primary convolution kernel to generate another secondary convolution kernel. This can not only resolve a problem that a quantity of secondary convolution kernels generated based on one primary convolution kernel is limited, but also more fully utilize the primary convolution kernel, and further reduce a parameter amount in the CNN.

According to a second aspect, an embodiment of this application provides a training method, where the method includes: performing image processing on a training sample by using a convolutional neural network, to obtain a predicted processing result, where the convolutional neural network includes N convolution layers, and the image processing includes: performing a convolution operation on the training sample by using M convolution kernels at an $n^{th}$ convolution layer, where the M convolution kernels include m primary convolution kernels and r secondary convolution kernels, the r secondary convolution kernels are obtained based on the m primary convolution kernels, one or more secondary convolution kernels are correspondingly obtained based on one primary convolution kernel, a quantity of non-zero elements included in each of the r secondary convolution kernels is less than a quantity of non-zero elements included in a primary convolution kernel corresponding to the secondary convolution kernel, both N and M are integers greater than 0, n is an integer greater than 0 and less than or equal to N, m is an integer greater than 0 and less than M, and r is an integer greater than 0 and less than M; determining, based on the predicted processing result and a standard result, a loss corresponding to the training sample, where the standard result is an expected processing result to be obtained by processing the training sample by using the convolutional neural network; and updating a parameter of the convolutional neural network by using an optimization algorithm based on the loss corresponding to the training sample.

The image processing may be image classification, object detection, image reconstruction, or the like. Each training sample is corresponding to one standard result. For example, an image processing apparatus performs image classification on a training sample, and a standard result corresponding to the training sample is a ground truth, namely, a real classification result, of the training sample.

In this embodiment of this application, in a convolutional neural network training process, the image processing apparatus generates, by using primary convolution kernels of the convolution layers in the convolutional neural network, secondary convolution kernels required by the convolution layers. This can reduce memory occupied by the convolutional neural network.

In an optional implementation, s secondary convolution kernels of the r secondary convolution kernels are obtained based on any one of the m primary convolution kernels; and the updating a parameter of the convolutional neural network by using an optimization algorithm based on the loss corresponding to the training sample includes: separately calculating, based on the loss corresponding to the training sample, gradients of the s secondary convolution kernels obtained based on the any one of the m primary convolution kernels; and using a sum of the gradients of the s secondary convolution kernels as a gradient of the any primary convolution kernel by using a backpropagation algorithm, and updating a parameter in the any primary convolution kernel.

In this implementation, a sum of gradients of a plurality of secondary convolution kernels is used as a gradient of a primary convolution kernel, to update the primary convolution kernel, so that a secondary convolution kernel generated based on an updated primary convolution kernel can meet requirements of convolution layers.

In an optional implementation, any one of the r secondary convolution kernels includes P channels; a primary convolution kernel corresponding to the any secondary convolution kernel includes P channels; a two-dimensional matrix, on a $p^{th}$ channel, of the any secondary convolution kernel includes a sub-matrix of a two-dimensional matrix, on a $p^{th}$ channel, of the primary convolution kernel corresponding to the any secondary convolution kernel; P is an integer greater than 0; and p is an integer greater than 0 and not greater than P.

In an optional implementation, an element included in the two-dimensional matrix, on the $p^{th}$ channel, of the any secondary convolution kernel is an element other than elements in outermost K rows and outermost K columns in the two-dimensional matrix, on the $p^{th}$ channel, of the primary convolution kernel corresponding to the any secondary convolution kernel; and K is an integer not less than 1.

In an optional implementation, any secondary convolution kernel includes a two-dimensional matrix on P contiguous channels of Q channels included in a primary convolution kernel corresponding to the any secondary convolution kernel, and P is less than Q.

In an optional implementation, any secondary convolution kernel is obtained by setting, to a target value, at least one element in a primary convolution kernel corresponding to the any secondary convolution kernel.

In an optional implementation, any secondary convolution kernel is obtained by setting, to a target value, an element in a target location in a two-dimensional matrix on each channel of a primary convolution kernel corresponding to the any secondary convolution kernel.

An element in a target location in a two-dimensional matrix may be an element other than elements in outermost K rows and outermost K columns in the two-dimensional matrix. K is an integer not less than 1.

In an optional implementation, any secondary convolution kernel is obtained by setting, to a target value, all elements in a two-dimensional matrix on one or more channels of a primary convolution kernel corresponding to the any secondary convolution kernel.

In an optional implementation, any secondary convolution kernel is obtained by setting, to a zero matrix, a two-dimensional matrix on at least one channel of a primary convolution kernel corresponding to the any secondary convolution kernel.

In an optional implementation, any secondary convolution kernel is a matrix obtained by calculating a product of an element in a location in a sampling matrix and an element in a corresponding location in a primary convolution kernel corresponding to the any secondary convolution kernel. The sampling matrix and the primary convolution kernel corresponding to the any secondary convolution kernel are homotypic matrices, and elements in all locations in the sampling matrix are in a one-to-one correspondence with elements in all locations in the primary convolution kernel. An element in a target location in the sampling matrix is 1, and all elements in locations other than the target location are 0.

In an optional implementation, any secondary convolution kernel is a matrix obtained by calculating a product of an element in a location in a sampling matrix and an element in a corresponding location in a primary convolution kernel corresponding to the any secondary convolution kernel. In a channel dimension, the sampling matrix includes (Q–P) zero matrices and P two-dimensional matrices in which all included elements are 1. The sampling matrix and the primary convolution kernel corresponding to the any secondary convolution kernel are homotypic matrices, and elements in all locations in the sampling matrix are in a one-to-one correspondence with elements in all locations in the primary convolution kernel. Q is an integer greater than 0. P is an integer greater than 0 and not greater than Q.

In an optional implementation, the training method further includes: obtaining a new secondary convolution kernel by using any one of the r secondary convolution kernels as a primary convolution kernel.

According to a third aspect, an embodiment of this application provides an electronic device, including: a processor and a memory, where the memory is configured to store code; and the processor is configured to perform the following operations by reading the code stored in the memory: receiving an input image; preprocessing the input image, to obtain preprocessed image information; performing convolution on the image information by using a convolutional neural network, where the convolutional neural network includes N convolution layers, and the convolution includes: performing a convolution operation on the image information by using M convolution kernels at an $n^{th}$ convolution layer, where the M convolution kernels include m primary convolution kernels and r secondary convolution kernels, the r secondary convolution kernels are obtained based on the m primary convolution kernels, one or more secondary convolution kernels are correspondingly obtained based on one primary convolution kernel, a quantity of non-zero elements included in each of the r secondary convolution kernels is less than a quantity of non-zero elements included in a primary convolution kernel corresponding to the secondary convolution kernel, both N and M are integers greater than 0, n is an integer greater than 0 and less than or equal to N, m is an integer greater than 0 and less than M, and r is an integer greater than 0 and less than M; and outputting a convolution result, where the convolution result includes M feature graphs.

In this embodiment of this application, an image processing apparatus may store primary convolution kernels of convolution layers first, and before performing convolution by using the convolution layers, generate, by using the primary convolution kernels of the convolution layers, secondary convolution kernels required by the convolution layers. This can greatly reduce memory occupied by the convolutional neural network.

In an optional implementation, any one of the r secondary convolution kernels includes P channels; a primary convolution kernel corresponding to the any secondary convolution kernel includes P channels; a two-dimensional matrix, on a $p^{th}$ channel, of the any secondary convolution kernel includes a sub-matrix of a two-dimensional matrix, on a $p^{th}$ channel, of the primary convolution kernel corresponding to the any secondary convolution kernel; P is an integer greater than 0; and p is an integer greater than 0 and not greater than P.

In an optional implementation, an element included in the two-dimensional matrix, on the $p^{th}$ channel, of the any secondary convolution kernel is an element other than elements in outermost K rows and outermost K columns in the two-dimensional matrix, on the $p^{th}$ channel, of the primary convolution kernel corresponding to the any secondary convolution kernel; and K is an integer not less than 1.

In an optional implementation, any secondary convolution kernel includes a two-dimensional matrix on P contiguous channels of Q channels included in a primary convolution kernel corresponding to the any secondary convolution kernel, and P is less than Q.

In an optional implementation, the processor is further configured to set, to a target value, at least one element in the primary convolution kernel corresponding to the any secondary convolution kernel, to obtain the any secondary convolution kernel.

In an optional implementation, the processor is further configured to set, to a target value, an element in a target location in a two-dimensional matrix on each channel of the primary convolution kernel corresponding to the any secondary convolution kernel, to obtain the any secondary convolution kernel.

In an optional implementation, the processor is further configured to set, to a target value, all elements in a two-dimensional matrix on one or more channels of the primary convolution kernel corresponding to the any secondary convolution kernel, to obtain the any secondary convolution kernel.

In an optional implementation, the processor is further configured to set, to a zero matrix, a two-dimensional matrix on at least one channel of the primary convolution kernel corresponding to the any secondary convolution kernel, to obtain the any secondary convolution kernel.

In an optional implementation, the processor is further configured to train the convolutional neural network; and a training process includes: initializing the m primary convolution kernels at the $n^{th}$ convolution layer in the convolutional neural network; performing image processing on a training sample by using the convolutional neural network, to obtain an image processing result; calculating, based on the image processing result and a standard result, a loss corresponding to the training sample, where the standard result is an expected processing result to be obtained by processing the training sample by using the convolutional neural network; separately calculating, based on the loss corresponding to the training sample, gradients of the s secondary convolution kernels obtained based on the any one of the m primary convolution kernels; and using a sum of the gradients of the s secondary convolution kernels as a gradient of the any primary convolution kernel by using a backpropagation algorithm, and updating a parameter in the any primary convolution kernel.

In an optional implementation, the processor is further configured to calculate a product of an element in a location in a sampling matrix and an element in a corresponding location in the primary convolution kernel corresponding to the any secondary convolution kernel, to obtain the any secondary convolution kernel. In a channel dimension, the sampling matrix includes (Q−P) zero matrices and P two-dimensional matrices in which all included elements are 1. The sampling matrix and the primary convolution kernel corresponding to the any secondary convolution kernel are homotypic matrices, and elements in all locations in the sampling matrix are in a one-to-one correspondence with elements in all locations in the primary convolution kernel. Q is an integer greater than 0. P is an integer greater than 0 and not greater than Q.

In an optional implementation, the processor is further configured to obtain a new secondary convolution kernel by using any one of the r secondary convolution kernels as a primary convolution kernel.

In an optional implementation, s secondary convolution kernels of the r secondary convolution kernels are obtained based on any one of the m primary convolution kernels; and the processor is further configured to: separately calculate gradients of the s secondary convolution kernels, to obtain s gradients, where s is an integer not less than 1; and use a sum of the s gradients as a gradient of the any primary convolution kernel by using a backpropagation algorithm, and update the any primary convolution kernel.

According to a fourth aspect, an embodiment of this application provides another electronic device, including: a processor and a memory, where the memory is configured to store code; and the processor is configured to perform the following operations by reading the code stored in the memory: performing image processing on a training sample by using a convolutional neural network, to obtain a predicted processing result, where the convolutional neural network includes N convolution layers, and the image processing includes: performing a convolution operation on the training sample by using M convolution kernels at an $n^{th}$ convolution layer, where the M convolution kernels include m primary convolution kernels and r secondary convolution kernels, the r secondary convolution kernels are obtained based on the m primary convolution kernels, one or more secondary convolution kernels are correspondingly obtained based on one primary convolution kernel, a quantity of non-zero elements included in each of the r secondary convolution kernels is less than a quantity of non-zero elements included in a primary convolution kernel corresponding to the secondary convolution kernel, both N and M are integers greater than 0, n is an integer greater than 0 and less than or equal to N, m is an integer greater than 0 and less than M, and r is an integer greater than 0 and less than M; determining, based on the predicted processing result and a standard result, a loss corresponding to the training sample, where the standard result is an expected processing result to be obtained by processing the training sample by using the convolutional neural network; and updating a parameter of the convolutional neural network by using an optimization algorithm based on the loss corresponding to the training sample.

In this embodiment of this application, in a convolutional neural network training process, the electronic device generates, by using primary convolution kernels of the convolution layers in the convolutional neural network, secondary convolution kernels required by the convolution layers. This can greatly reduce memory occupied by the convolutional neural network.

In an optional implementation, s secondary convolution kernels of the r secondary convolution kernels are obtained based on any one of the m primary convolution kernels.

The processor is specifically configured to: separately calculate gradients of the s secondary convolution kernels, to obtain s gradients, where s is an integer not less than 1; and use a sum of the s gradients as a gradient of the any primary convolution kernel by using a backpropagation algorithm, and update the any primary convolution kernel.

In this implementation, a primary convolution kernel is updated by using a loss function relative to a sum of gradients of secondary convolution kernels, so that a secondary convolution kernel generated based on an updated primary convolution kernel can meet requirements of convolution layers.

In an optional implementation, any one of the r secondary convolution kernels includes P channels; a primary convolution kernel corresponding to the any secondary convolution kernel includes P channels; a two-dimensional matrix, on a $p^{th}$ channel, of the any secondary convolution kernel includes a sub-matrix of a two-dimensional matrix, on a $p^{th}$ channel, of the primary convolution kernel corresponding to the any secondary convolution kernel; P is an integer greater than 0; and p is an integer greater than 0 and not greater than P.

In an optional implementation, an element included in the two-dimensional matrix, on the $p^{th}$ channel, of the any secondary convolution kernel is an element other than elements in outermost K rows and outermost K columns in the two-dimensional matrix, on the $p^{th}$ channel, of the primary convolution kernel corresponding to the any secondary convolution kernel; and K is an integer not less than 1.

In an optional implementation, any secondary convolution kernel includes a two-dimensional matrix on P contiguous channels of Q channels included in a primary convolution kernel corresponding to the any secondary convolution kernel, and P is less than Q.

In an optional implementation, the processor is further configured to set, to a target value, at least one element in the primary convolution kernel corresponding to the any secondary convolution kernel, to obtain the any secondary convolution kernel.

In an optional implementation, the processor is further configured to set, to a target value, an element in a target location in a two-dimensional matrix on each channel of the primary convolution kernel corresponding to the any secondary convolution kernel, to obtain the any secondary convolution kernel.

In an optional implementation, the processor is further configured to set, to a target value, all elements in a two-dimensional matrix on one or more channels of the primary convolution kernel corresponding to the any secondary convolution kernel, to obtain the any secondary convolution kernel.

In an optional implementation, the processor is further configured to set, to a zero matrix, a two-dimensional matrix on at least one channel of the primary convolution kernel corresponding to the any secondary convolution kernel, to obtain the any secondary convolution kernel.

In an optional implementation, the processor is further configured to calculate a product of an element in a location in a sampling matrix and an element in a corresponding location in the primary convolution kernel corresponding to the any secondary convolution kernel, to obtain the any secondary convolution kernel. The sampling matrix and the primary convolution kernel corresponding to the any secondary convolution kernel are homotypic matrices. An element in a target location in the sampling matrix is 1, and all elements in locations other than the target location are 0.

In an optional implementation, the processor is further configured to calculate a product of an element in a location in a sampling matrix and an element in a corresponding location in the primary convolution kernel corresponding to the any secondary convolution kernel, to obtain the any secondary convolution kernel. In a channel dimension, the sampling matrix includes (Q−P) zero matrices and P two-dimensional matrices in which all included elements are 1. The sampling matrix and the primary convolution kernel corresponding to the any secondary convolution kernel are homotypic matrices, and elements in all locations in the sampling matrix are in a one-to-one correspondence with elements in all locations in the primary convolution kernel. Q is an integer greater than 0. P is an integer greater than 0 and not greater than Q.

In an optional implementation, the processor is further configured to obtain a new secondary convolution kernel by using any one of the r secondary convolution kernels as a primary convolution kernel.

According to a fifth aspect, an embodiment of this application provides a computer program product. The computer program product includes a program instruction. When the program instruction is executed by a processor, the processor is enabled to perform the methods according to the first aspect or the second aspect.

According to a sixth aspect, an embodiment of this application provides a computer readable storage medium. The computer readable storage medium stores a computer program. The computer program includes a program instruction. When the program instruction is executed by a processor, the processor is enabled to perform the methods according to the first aspect or the second aspect.

According to a seventh aspect, an embodiment of this application provides a chip. The chip includes a processor and a data interface. The processor reads, through the data interface, an instruction stored in a memory, to perform the methods according to the first aspect or the second aspect.

BRIEF DESCRIPTION OF DRAWINGS

FIG. 7 is still another schematic diagram of a comparison between a primary convolution kernel and a secondary convolution kernel according to an embodiment of this application;

DESCRIPTION OF EMBODIMENTS

Figure 1:
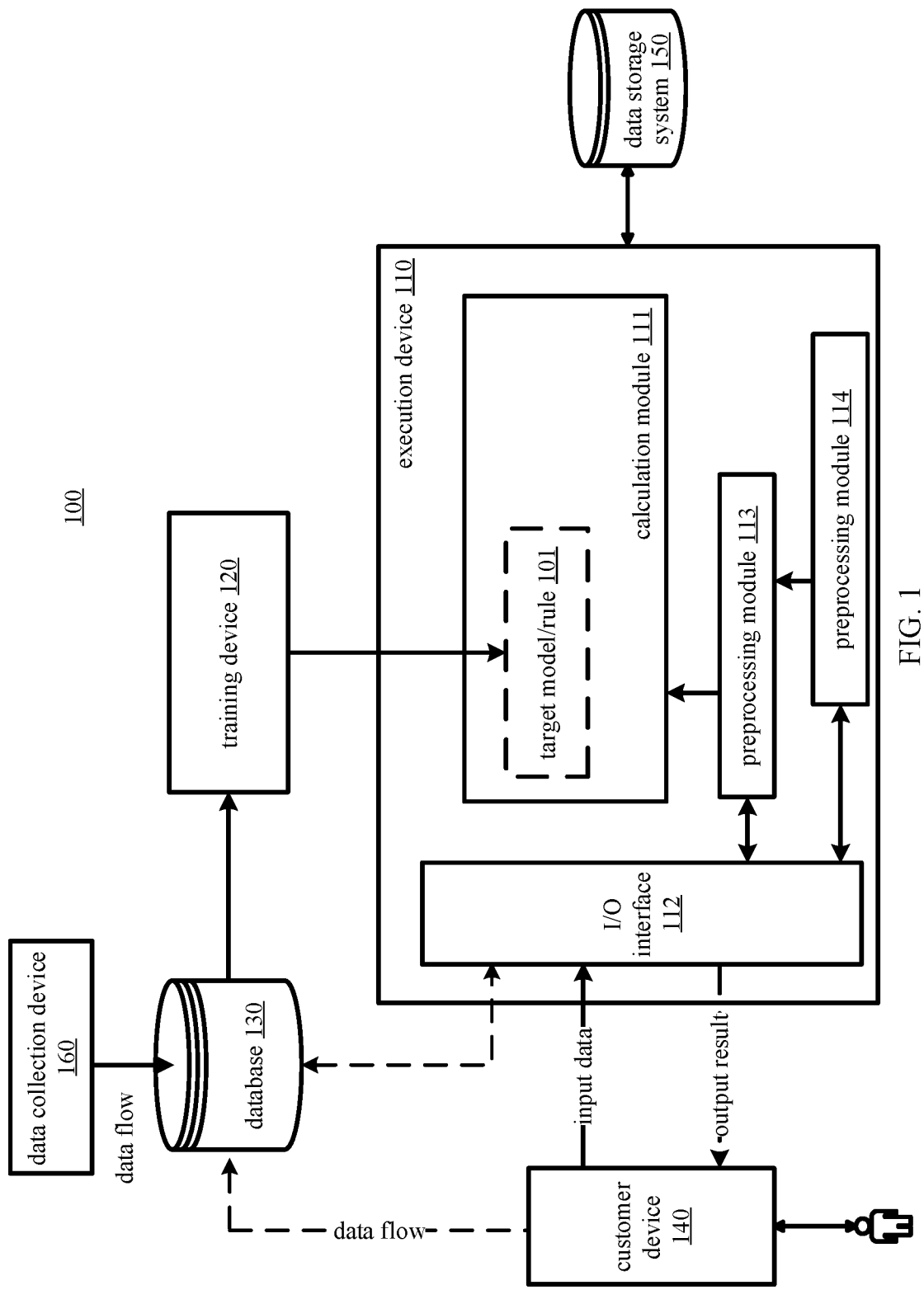
FIG. 1 is a schematic structural diagram of a system architecture according to an embodiment of this application.

The following describes technical solutions of this application with reference to accompanying drawings.

A convolutional neural network-based image processing method provided in the embodiments of this application can be applied to scenarios such as image classification, target detection, super-resolution image reconstruction, and image restoration. Specifically, the convolutional neural network-based image processing method in the embodiments of this application can be applied to the image classification scenario and the super-resolution image reconstruction scenario. The following briefly describes the image classification scenario and the super-resolution image reconstruction scenario.

Image classification scenario 1: An image processing apparatus classifies, by using a convolutional neural network, an image collected by a data collection device (for example, a camera), to obtain an image classification result, and may further perform a corresponding subsequent operation based on the image classification result. The image processing apparatus may be a terminal, for example, a mobile phone terminal, a tablet computer, a notebook computer, an augmented reality (AR) device, a virtual reality (VR) device, or an in-vehicle terminal; or may be a server. For example, the image processing apparatus may be a fingerprint attendance machine. The image processing apparatus collects, by using a fingerprint collection apparatus, a fingerprint image input by a user, classifies the fingerprint image to determine an identity of the user, and generates a corresponding attendance record. For another example, the image processing apparatus may be an access control system. The image processing apparatus collects a face image of a user by using a camera, identifies the face image to determine an identity of the user, and after determining that the user is an authorized user, opens a passage to let the user pass.

Image classification scenario 2: An image processing apparatus classifies, by using a convolutional neural network, an image coming from a customer device, to obtain an image classification result, and performs a corresponding subsequent operation based on the image classification result. The image processing apparatus may be a device or a server that has a data processing function, for example, a cloud server, a network server, an application server, or a management server. The customer device may be a mobile phone, a tablet computer, or the like. For example, the image processing apparatus is a cloud server. When a user queries for social security by using a software application on a mobile phone, the user collects a face image of the user by using the mobile phone, and sends the face image to the image processing apparatus. The image processing apparatus identifies the face image to determine an identity of the user, and after determining the identity of the user, sends social security information of the user to the mobile phone.

Super-resolution image reconstruction scenario: An image processing apparatus performs super-resolution image reconstruction on an input image with a relatively low resolution by using a convolutional neural network, to obtain an image with a relatively high resolution. The input image may be a remote sensing image, a medical image (for example, an image photographed by using a medical device such as an X-ray machine or a nuclear magnetic resonance scanner), a video image, or the like. The image processing apparatus may be a device or a server that has a data processing function, for example, a cloud server, a network server, an application server, or a management server. For example, the image processing apparatus is a computer. The image processing apparatus performs super-resolution image reconstruction on a remote sensing image, to obtain an image with a higher resolution.

In the foregoing scenarios, before performing convolution operations on image information by using convolution layers in the convolutional neural network, the image processing apparatus obtains secondary convolution kernels based on primary convolution kernels of the convolution layers, and performs convolution operations on input image information at the convolution layers by using the primary convolution kernels and the secondary convolution kernels. This greatly reduces a memory space occupied by the convolutional neural network.

The following describes methods provided in this application from a model training side and a model application side.

A convolutional neural network training method provided in the embodiments of this application relates to processing of computer vision, and may be specifically applied to image processing methods such as data training, machine learning, and deep learning, to perform symbolic and formal intelligent information modeling, extraction, preprocessing, training, and the like on training data (for example, an input image in this application), and finally obtain a trained convolutional neural network. In addition, the trained convolutional neural network may be used in the convolutional neural network-based image processing method provided in the embodiments of this application, and input data (for example, the input image in this application) is input into the trained convolutional neural network, to obtain output data (for example, an image processing result or a processed image in this application). It should be noted that the convolutional neural network training method and the convolutional neural network-based image processing method provided in the embodiments of this application may also be understood as two parts of a system or two phases of an entire procedure, for example, a model training phase and a model application phase.

Because the embodiments of this application relate to application of a large quantity of neural networks, for ease of understanding, the following first describes related terms included in the embodiments of this application and related concepts such as a neural network.

(1) A convolutional neural network is a deep neural network having a convolutional structure. The convolutional neural network includes a feature extractor including a convolution layer and a sub sampling layer. The feature extractor may be considered as a filter. A convolution process may be considered as performing convolution on an input image or a convolution feature map by using a trainable filter. The convolution feature map may also be referred to as a feature graph. The convolution layer is a neuron layer that is in the convolutional neural network and that performs convolution processing on an input signal. At the convolution layer in the convolutional neural network, a neuron may be connected only to some adjacent-layer neurons. A convolution layer usually includes several feature maps. Each feature map may include some neuron arranged in a rectangular shape. Neural units of a same feature map share a weight. A weight matrix corresponding to the shared weight herein is a convolution kernel. Weight sharing may be understood as that an image information extraction manner is irrelevant to a location. A principle implied herein is as follows: Statistical information of a part of an image is the same as that of another part. This means that image information obtained from the part through learning can also be applied to the another part. Therefore, same image information obtained through learning can be used for all locations in the image. At a same convolution layer, a plurality of convolution kernels may be used to extract different image information. Usually, a larger quantity of convolution kernels indicates richer image information reflected through convolution.

A convolution kernel may be initialized in a form of a random-size matrix. An appropriate weight may be obtained by a convolution kernel through learning in a convolutional neural network training process. In addition, direct benefits of the weight sharing are as follows: A quantity of connections between layers in the convolutional neural network is reduced, and an overfitting risk is also reduced.

(2) Loss function

In a convolutional neural network training process, an output of a convolutional neural network is expected to be as close to a really wanted value as possible. Therefore, a current predicted value of a network may be compared with a really wanted target value, and then a weight vector of each layer of neural network may be updated based on a difference between the current predicted value of the network and the really wanted target value (certainly, there is usually an initialization process before a first update, that is, a parameter is preconfigured for each layer in the convolutional neural network). For example, if a predicted value of the network is excessively high, the weight vector is adjusted to make the predicted value of the network lower. Adjustment is continuously performed, until the really wanted target value or a value quite close to the really wanted target value can be obtained for the convolutional neural network through prediction. Therefore, "how to obtain, through comparison, a difference between a predicted value and a target value" needs to be predefined. This is the loss function or an objective function. The loss function and the objective function are equations used to measure a difference between a predicted value and a target value. Using the loss function as an example, a larger output value (loss) of the loss function indicates a larger difference. Then convolutional neural network training becomes a process of minimizing the loss.

(3) Backpropagation algorithm

In a convolutional neural network training process, a value of a parameter in the convolutional neural network may be modified by using an error backpropagation (BP) algorithm, so that an error loss between a predicted value output by the convolutional neural network and a really wanted target value becomes smaller. Specifically, an error loss is produced in a feed-forward process from inputting to outputting of a signal, and the parameter in the original convolutional neural network is updated through backpropagation of error loss information, so as to converge the error loss. The backpropagation algorithm is an error-loss-centered backpropagation motion intended to obtain an optimal parameter of a convolutional neural network, for example, a weight matrix, namely, a convolution kernel of a convolution layer.

The following describes a system architecture provided in the embodiments of this application.

Referring to FIG. 1, an embodiment of the present application provides a system architecture 100. As shown in the system architecture 100, a data collection device 160 is configured to collect training data. In this embodiment of this application, the training data includes: one or more test images (training samples), and a real result corresponding to the one or more test images, namely, an expected ideal result to be obtained by processing the one or more test images by using a convolutional neural network. In addition, the training data may be stored in a database 130. A training device 120 may obtain, through training, a target model/rule 101 (101 is the aforementioned model obtained through training in a training phase, and may be a convolutional neural network configured to implement image processing operations such as image classification and super-resolution image reconstruction) based on training data maintained in the database 130. One test image is corresponding to one real result, namely, a ground truth. By using Embodiment 1, the following describes in more details how the training device 120 obtains the target model/rule 101 based on the training data. The target model/rule 101 can be used to implement a convolutional neural network-based image processing method provided in the embodiments of this application. To be specific, image information obtained through related preprocessing on an input image, such as a low-resolution image on which super-resolution processing is to be performed or an image on which image classification processing is to be performed, is input into the target model/rule 101 to obtain an image processing result. The target model/rule 101 in this embodiment of this application may be specifically a convolutional neural network obtained through training. In this embodiment provided in this application, the convolutional neural network is obtained by training an initialized convolutional neural network. It should be noted that, in actual application, the training data maintained in the database 130 is not necessarily all collected by the data collection device 160, and may be received from another device. In addition, it should be noted that the training device 120 trains the target model/rule 101 not necessarily completely based on the training data maintained in the database 130, and may obtain training data from a cloud or another place to perform model training. The foregoing descriptions should not be construed as a limitation on this embodiment of this application.

The target model/rule 101 obtained by the training device 120 through training may be applied to different systems or devices, for example, applied to an execution device 110 in FIG. 1. The execution device 110 may be a terminal, for example, a mobile phone terminal, a tablet computer, a notebook computer, an AR device, a VR device, or an in-vehicle terminal; or may be a server, or the like. In FIG. 1, the execution device 110 is configured with an I/O interface 112, configured to exchange data with an external device. A user may input data into the I/O interface 112 by using a customer device 140. In this embodiment of this application, the input data may include an input image. The input image may be an image collected by the execution device 110 by using the data collection device 160, or may be an image in the database 130, or may be an image coming from the customer device 140.

A preprocessing module 113 is configured to perform preprocessing based on the input data (for example, the input image) received by the I/O interface 112. In this embodiment of this application, the preprocessing module 113 may be configured to implement one or more of the following operations: image filtering, image enhancement preprocessing, image smoothing preprocessing, image restoration preprocessing, and the like; and is further configured to implement other preprocessing operations. This is not limited in this application.

In a related processing procedure in which the execution device 110 preprocesses the input data or a calculation module 111 of the execution device 110 performs calculation, the execution device 110 may invoke data, code, and the like in a data storage system 150 to implement corresponding processing, or may store, into the data storage system 150, data, an instruction, and the like obtained through corresponding processing.

Finally, the I/O interface 112 returns a processing result, for example, the foregoing obtained image processing result, to the customer device 140, so as to provide the processing result to the user.

It should be noted that the training device 120 may obtain, through training, a corresponding target model/rule 101 based on different training data for different targets, which are alternatively referred to as different tasks. The corresponding target model/rule 101 may be used to implement the foregoing targets or complete the foregoing tasks, so as to provide a required result for the user.

In a case shown in FIG. 1, the user may manually provide input data. The manually providing may be performed by using a screen provided on the I/O interface 112. In another case, the customer device 140 may automatically send input data to the I/O interface 112. If it is required that authorization by the user need to be obtained for the customer device 140 to automatically send the input data, the user may set corresponding permission in the customer device 140. The user may view, in the customer device 140, a result output by the execution device 110. A specific presentation form may be a specific manner such as display, a sound, or an action. The customer device 140 may also be used as a data collection end to collect the input data that is input into the I/O interface 112 and an output result that is output from the I/O interface 112, as shown in the figure, use the input data and the output result as new sample data, and store the new sample data into the database 130. Certainly, alternatively, the customer device 140 may not perform collection, but the I/O interface 112 directly uses, as new sample data, the input data that is input into the I/O interface 112 and an output result that is output by the I/O interface 112, as shown in the figure, and the new sample data is stored into the database 130.

It should be noted that FIG. 1 is merely a schematic diagram of a system architecture according to an embodiment of the present application. A location relationship between a device, a component, a module, and the like shown in the figure constitutes no limitation. For example, in FIG. 1, the data storage system 150 is an external memory relative to the execution device 110. In another case, the data storage system 150 may be alternatively configured in the execution device 110. In this application, the target model/rule 101 obtained through training based on the training data may be a convolutional neural network configured to process an image processing task.

Currently, a trained CNN usually includes a large quantity of redundant parameters. To reduce storage resources occupied by the CNN in a device, currently, the following two manners are mainly used to reduce a parameter amount in the CNN: manner 1: compressing a convolution kernel in the trained CNN; manner 2: replacing a larger-size convolution kernel with a smaller-size convolution kernel. The parameter amount in the CNN is a quantity of parameters in the CNN. In the manner 1, a parameter in the convolution kernel in the trained CNN is represented again in a manner of pruning, quantization, dictionary learning, or the like. This can reduce storage overheads of the CNN, but some special calculation manners, such as sparse calculation, matrix factorization, and quantization, need to be introduced in a process of performing a convolution operation by using the CNN obtained through compression in the manner 1. It is difficult to deploy the calculation manners on a general purpose calculation platform (for example, a mobile terminal). A disadvantage of the manner 2 is that a convolution kernel in the CNN is not fully utilized, and the convolution kernel includes a large amount of redundant information. In these two manners, merely how to remove and prune a parameter in a convolution kernel is considered, without considering how to more fully utilize the convolution kernel. This application is intended to reduce storage resources occupied by a CNN mainly from a perspective of maximally utilizing a convolution kernel in the CNN. By using Table 1, the following describes a problem that a parameter in a CNN is not fully utilized, and a implementation that a parameter amount in the CNN can be reduced and calculation precision of the CNN can be improved or ensured by properly optimizing a parameter in the CNN.

50 have relatively small parameter amounts is higher than classification accuracy of the AlexNet and the VGGNet-16 have relatively large parameter amounts. It may be understood that many parameters in the CNN are redundant, and a larger parameter amount in the CNN does not necessarily indicate higher calculation precision of the CNN. This drives development of a more efficient convolutional calculation manner, with an expectation of implementing more effective calculation by using fewer parameters, and improving, as far as possible, performance for performing image processing by using the CNN while reducing calculation overheads and memory occupied by the CNN. This application provides a convolutional neural network-based image processing solution with low storage overheads.

As shown in FIG. 1, the target model/rule 101 is obtained through training by the training device 120. In this embodiment of this application, the target model/rule 101 may be a convolutional neural network. Specifically, convolution layers in the convolutional neural network provided in this embodiment of this application include only primary convolution kernels. Before convolution operations are performed by using the convolution layers, secondary convolution kernels are obtained based on the primary convolution kernels of the convolution layers. A convolution operation is performed on input image information at each convolution layer by using a primary convolution kernel and a secondary convolution kernel of the convolution layer.

As described in the foregoing basic concepts, the convolutional neural network is a deep neural network having a

TABLE 1

| Network | Parameter amount | Occupied memory | Quantity of times of calculation | Top 1 error rate | Top 5 error rate |
| --- | --- | --- | --- | --- | --- |
| AlexNet | $6.1 \times 10^7$ | 232.5 MB | $0.7 \times 10^9$ | 42.9% | 19.8% |
| VGGNet-16 | $13.1 \times 10^7$ | 526.4 MB | $15.4 \times 10^9$ | 28.5% | 9.9% |
| GooLeNet | $0.7 \times 10^7$ | 26.3 MB | $1.5 \times 10^9$ | 34.2% | 12.9% |
| ResNet-50 | $2.6 \times 10^7$ | 97.2 MB | $4.1 \times 10^9$ | 24.7% | 7.8% |
| ResNeXt-50 | $2.5 \times 10^7$ | 95.3 MB | $4.2 \times 10^9$ | 22.6% | 6.5% |

Table 1 shows attributes of some deep convolutional neural network (CNN) models that have made achievements on an ImageNet dataset in recent years, including a parameter amount, occupied memory, a quantity of times of floating-point calculation, and accuracy of the deep convolutional neural network models. The quantity of times of calculation in Table 1 is a quantity of times of floating-point calculation separately performed for classifying images in the ImageNet dataset by using the networks in Table 1. A floating-point operation is a real number operation. The CNN is a deep neural network. The ImageNet dataset may be understood as an image library used for image/vision training, and is used to evaluate performance of different algorithms and networks. The AlexNet, the VGGNet-16, the GooLeNet, the ResNet-50, and the ResNeXt-50 in Table 1 are different deep convolutional neural networks (CNN), and are used to classify the images in the ImageNet dataset. The Top 1 error rate is a probability that a predicted most probable classification is an error classification (a top 1 prediction error rate). The Top 5 error rate is a probability that predicted most probable five classifications do not include a correct classification (a top 5 prediction error rate). In Table 1, both a Top 1 error rate and a Top 5 error rate of a network are in a negative correlation with classification accuracy of the network. It can be learned from Table 1 classification accuracy of the ResNet-50 and the ResNeXtconvolutional structure, and is a deep learning architecture. The deep learning architecture means performing a plurality of levels of learning on different abstract tiers by using a machine learning algorithm. As a deep learning architecture, the CNN is a feed-forward artificial neural network. Neurons in the feed-forward artificial neural network may respond to an image input into the feed-forward artificial neural network.

Figure 2:
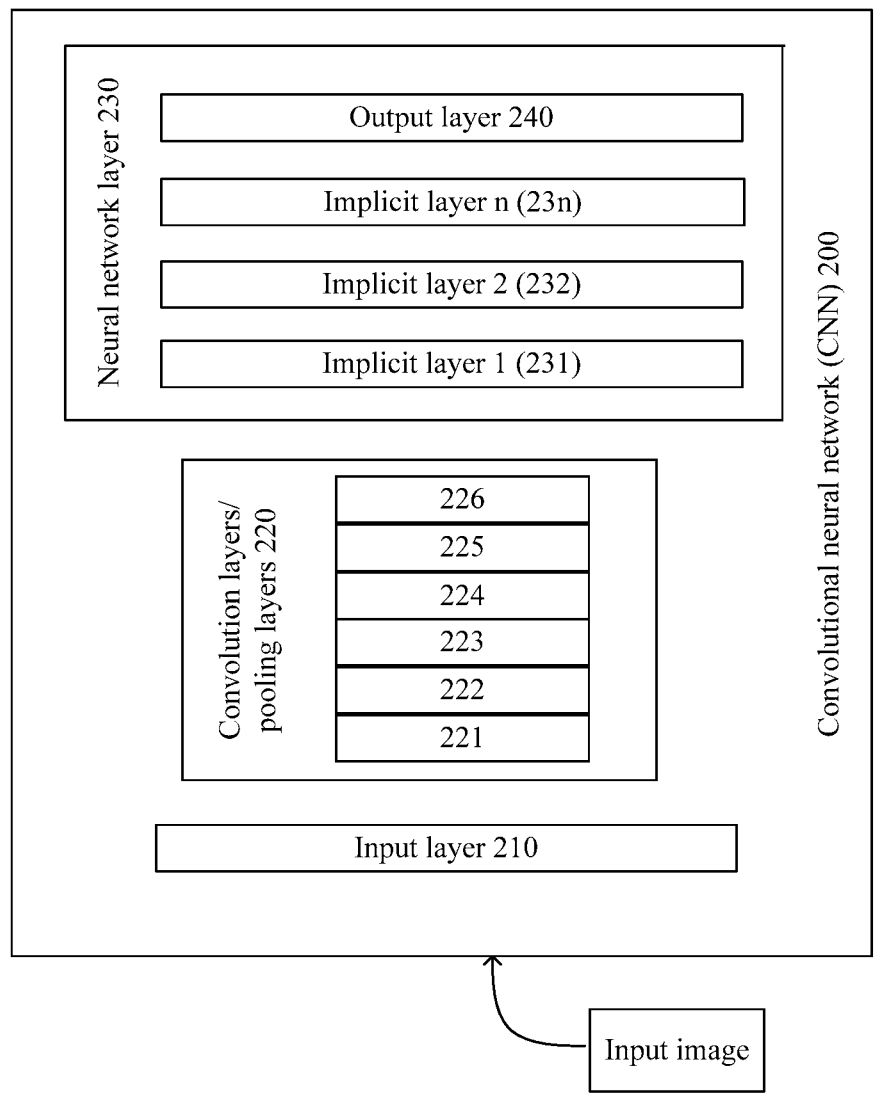
FIG. 2 is a schematic structural diagram of a convolutional neural network according to an embodiment of this application.

As shown in FIG. 2, a convolutional neural network (CNN) 200 may include an input layer 210, convolution layers/pooling layers 220 (where the pooling layers are optional), and a neural network layer 230.

Convolution Layers/Pooling Layers 220:

Convolution Layers:

As shown in FIG. 2, the convolution layers/pooling layers 220 may include layers 221 to 226 in an example. For example, in an implementation, the layer 221 is a convolution layer, the layer 222 is a pooling layer, the layer 223 is a convolution layer, the layer 224 is a pooling layer, the layer 225 is a convolution layer, and the layer 226 is a pooling layer; in another implementation, the layers 221 and 222 are convolution layers, the layer 223 is a pooling layer, the layers 224 and 225 are convolution layers, and the layer 226 is a pooling layer. That is, an output of a convolution layer may be used as an input of a following pooling layer, or may be used as an input of another convolution layer to continue to perform convolution.

The following describes an internal operating principle of a convolution layer by using the convolution layer 221 as an example.

The convolution layer 221 may include many convolution filters. A convolution filter is also referred to as a convolution kernel. During image processing, the convolution kernel is equivalent to a filter that extracts specific information from an input image matrix. The convolution kernel may be essentially a weight matrix. The weight matrix is usually predefined. In a process of performing convolution on an image, depending on a value of a stride, the weight matrix usually processes one pixel after another pixel or two pixels after another two pixels in an input image along a horizontal direction, so as to complete a task of extracting a specific feature from the image. A size of the weight matrix should be related to a size of the image. It should be noted that a depth dimension of the weight matrix is the same as a depth dimension of the input image. During a convolution operation, the weight matrix extends to an entire depth of the input image. The depth dimension is also a channel dimension, and is corresponding to a quantity of channels. Therefore, one convolutional output with a single depth dimension is generated after convolution is performed by using a single weight matrix. However, in most cases, a plurality of weight matrices with a same size (rows×columns), namely, a plurality of homotypic matrices, are applied instead of a single weight matrix. Outputs of the weight matrices are stacked to form a depth dimension of a convolutional image. The dimension herein may be understood as being determined based on the foregoing "plurality". Different weight matrices may be used to extract different features of an image. For example, a weight matrix is used to extract edge information of the image, another weight matrix is used to extract a specific color of the image, and still another weight matrix is used to blur unnecessary noise in the image. The plurality of weight matrices have the same size (rows×columns). Feature graphs extracted by using the plurality of weight matrices with the same size also have a same size. Then the plurality of extracted feature graphs with the same size are combined to form a convolution operation output. In the embodiments of this application, before convolution operations are performed by using convolution layers, secondary convolution kernels are obtained based on primary convolution kernels of the convolution layers. A convolution operation is performed on input image information at each convolution layer by using a primary convolution kernel and a secondary convolution kernel of the convolution layer.

In actual application, weighted values in the weight matrices need to be obtained through massive training. Weight matrices formed by weighted values obtained through training may be used to extract information from an input image, so that the convolutional neural network 200 performs correct prediction. A weight matrix is a convolution kernel. A weighted value in the weight matrix is a parameter in the convolution kernel. The parameter in the convolution kernel may also be referred to as an element in the convolution kernel.

When the convolutional neural network 200 has a plurality of convolution layers, an initial convolution layer (for example, 221) usually extracts a relatively large quantity of general features. The general feature may also be referred to as a low-level feature. As a depth of the convolutional neural network 200 increases, a feature extracted by a subsequent convolution layer (for example, 226) becomes more complex, for example, a feature including a high-level semantic meaning. A feature with a higher-level semantic meaning is more applicable to a to-be-resolved problem.

Pooling Layers:

A quantity of training parameters usually needs to be reduced. Therefore, pooling layers usually need to be periodically introduced after convolution layers. In the layers 221 to 226 marked by 220 in FIG. 2, one convolution layer may be followed by one pooling layer, or a plurality of convolution layers may be followed by one or more pooling layers. During image processing, an only objective of a pooling layer is to reduce a space size of an image. The pooling layer may be used to perform an average pooling operation and/or a maximum pooling operation, so as to perform sampling on an input image to obtain a smaller-size image. The average pooling operation may be used to perform calculation on pixel values in the image in a specific range, to generate an average value. The average value is used as an average pooling result. The maximum pooling operation may be used to take a maximum pixel value in the specific range as a maximum pooling result. In addition, a size of a weight matrix at a convolution layer can be related to an image size, and similarly, an operator at a pooling layer should also be related to an image size. A size of an output image obtained through processing at a pooling layer may be smaller than a size of an input image of the pooling layer. Each pixel in the output image of the pooling layer represents an average value or a maximum value of a corresponding sub-region of the input image of the pooling layer.

Neural Network Layer 230:

After processing is performed at the convolution layers/pooling layers 220, the convolutional neural network 200 still cannot output required output information, because as described above, at the convolution layers/pooling layers 220, only a feature is extracted, and parameters resulting from an input image are reduced. However, to generate final output information (required class information or other related information), the convolutional neural network 200 needs to generate, by using the neural network layer 230, one output or a group of outputs whose quantity is equal to a quantity of required classes. Therefore, the neural network layer 230 may include a plurality of implicit layers (for example, layers 231, 232, . . . , and 23n shown in FIG. 2) and an output layer 240. Parameters included in the plurality of implicit layers may be obtained by performing pre-training based on related training data of specific task types. For example, the task types may include image recognition, image classification, and super-resolution image reconstruction.

The output layer 240 is after the plurality of implicit layers in the neural network layer 230, in other words, the output layer 240 is a last layer in the entire convolutional neural network 200. The output layer 240 has a loss function similar to classification cross entropy. The loss function is specifically used to calculate a predicted error. Once forward propagation (for example, in FIG. 2, propagation in a direction from 210 to 240 is the forward propagation) of the entire convolutional neural network 200 is completed, weighted values and offsets of the aforementioned layers start to be updated in backpropagation (for example, in FIG. 2, propagation in a direction from 240 to 210 is the backpropagation), so as to reduce a loss of the convolutional neural network 200 and an error between an ideal result and a result (namely, the foregoing image processing result) output by the convolutional neural network 200 by using the output layer.

It should be noted that the convolutional neural network 200 shown in FIG. 2 is merely used as an example of a convolutional neural network. In specific application, the convolutional neural network may alternatively exist in a form of another network model.

The following describes a hardware structure of a chip provided in an embodiment of this application.

Figure 3:
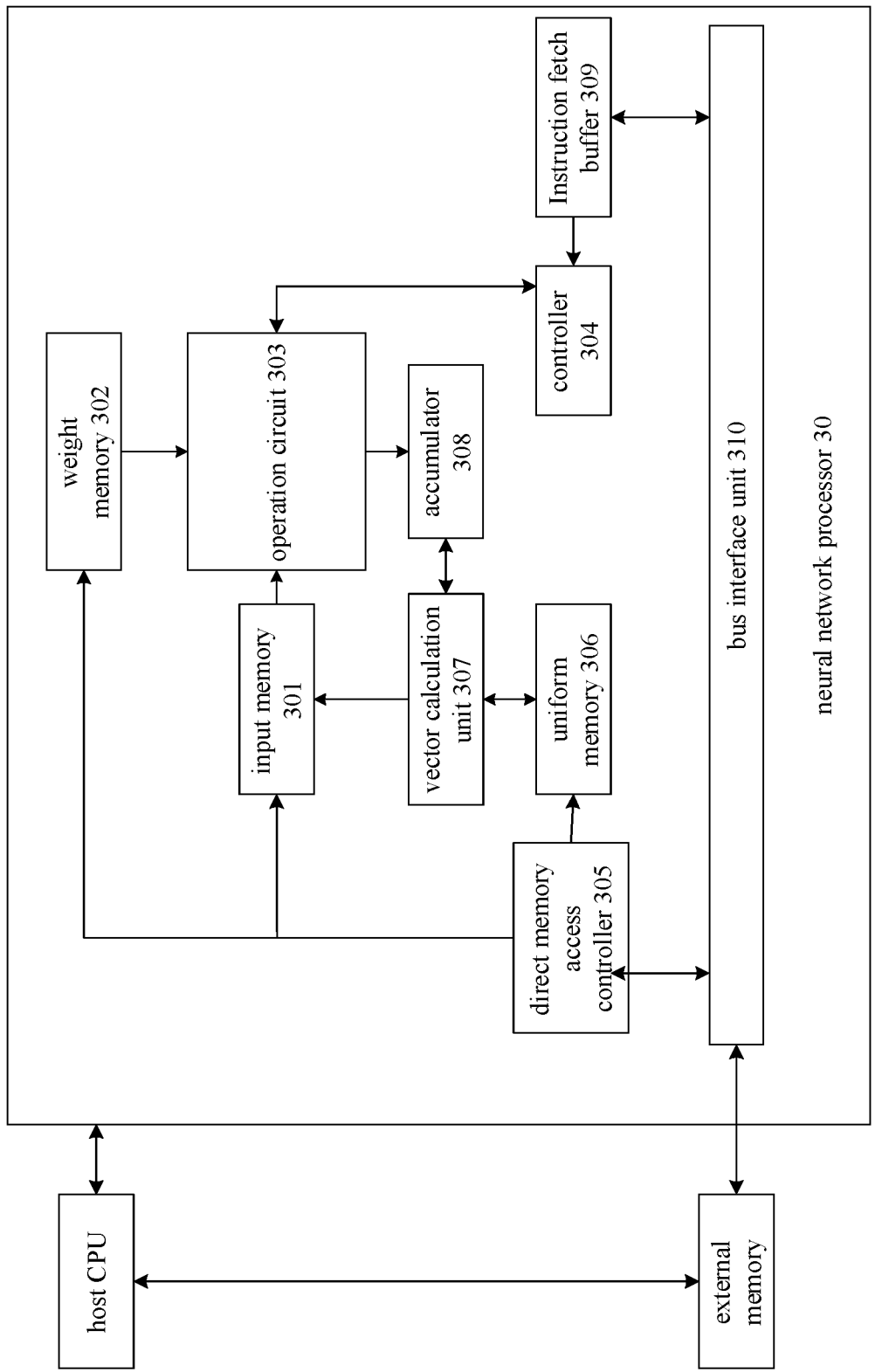
FIG. 3 is a schematic diagram of a hardware structure of a chip according to an embodiment of this application.

FIG. 3 is a hardware structure of a chip provided in an embodiment of the present application. The chip includes a neural network processor 30. The chip may be disposed in the execution device 110 shown in FIG. 1, to complete calculation work of the calculation module 111. The chip may be alternatively disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The neural network processor 30 may be any processor suitable for large-scale exclusive OR operation processing, for example, a neural-network processing unit (NPU), a tensor processing unit (TPU), or a graphics processing unit (GPU). Using the NPU as an example, the NPU may be used as a coprocessor and mounted to a central processing unit (CPU), namely, a host CPU. The host CPU assigns a task, for example, an image processing task, to the NPU. A core part of the NPU is an operation circuit 303. The operation circuit 303 is controlled by a controller 304 to extract matrix data in memories (301 and 302) and perform a multiply-add operation.

In some implementations, the operation circuit 303 includes a plurality of internal processing engines (PE). In some implementations, the operation circuit 303 is a two-dimensional systolic array. Alternatively, the operation circuit 303 may be a one-dimensional systolic array or another electronic line capable of performing mathematical operations such as multiplication and addition. In some implementations, the operation circuit 303 is a general purpose matrix processor.

For example, it is assumed that there are an input matrix A, a weight matrix B, and an output matrix C. The operation circuit 303 obtains a weighted value of the matrix B from the weight memory 302, and caches the weighted value in each PE of the operation circuit 303. The operation circuit 303 obtains input data of the matrix A from the input memory 301, performs a matrix operation based on the input data of the matrix A and the weighted value of the matrix B, to obtain a partial result or a final result of the matrix, and stores the result in an accumulator 308. The input data may be an input image, and the weight matrix is a convolution kernel. Weight data may also be referred to as a weight matrix.

A uniform memory 306 is configured to store input data and output data. The weight matrix is migrated to the weight memory 302 by using a direct memory access controller (DMAC) 305. The input data is also migrated to the uniform memory 306 by using the DMAC. The output data is an image processing result.

A bus interface unit (BIU) 310 is configured to implement interaction between the DMAC and an instruction fetch buffer 309. The bus interface unit 310 is further used by the instruction fetch buffer 309 to obtain an instruction from an external memory. The bus interface unit 310 is further used by the direct memory access controller 305 to obtain original data of the input matrix A or the weight matrix B from the external memory.

The DMAC is mainly configured to migrate input data in the external memory DDR to the uniform memory 306, or migrate weight data to the weight memory 302, or migrate input data to the input memory 301.

A vector calculation unit 307 includes a plurality of operation processing units, and performs further processing, for example, vector multiplication, vector addition, an exponential operation, a logarithmic operation, or a magnitude comparison, on an output of the operation circuit 303 if necessary. The vector calculation unit 307 is mainly used for calculation at non-convolution layers or fully connected (FC) layers in a neural network, and may specifically process calculation for pooling, normalization, and the like. For example, the vector calculation unit 307 may apply a non-linear function to the output, for example, a vector of an accumulated value, of the operation circuit 303, so as to generate an activation value. In some implementations, the vector calculation unit 307 generates a normalized value, a merge value, or both.

In some implementations, the vector calculation unit 307 stores a processed vector into the uniform memory 306. In some implementations, a vector processed by the vector calculation unit 307 can be used as an activation input of the operation circuit 303, for example, used for a subsequent layer in the neural network. As shown in FIG. 2, if a current processing layer is an implicit layer 1 (231), the vector processed by the vector calculation unit 307 may be further used in calculation at an implicit layer 2 (232).

The instruction fetch buffer 309 connected to the controller 304 is configured to store an instruction used by the controller 304.

All the uniform memory 306, the input memory 301, the weight memory 302, and the instruction fetch buffer 309 are on-chip memories. The external memory may be independent of the NPU hardware architecture.

Operations at various layers in the convolutional neural network shown in FIG. 2 may be performed by the operation circuit 303 or the vector calculation unit 307.

Embodiment 1

Figure 4:
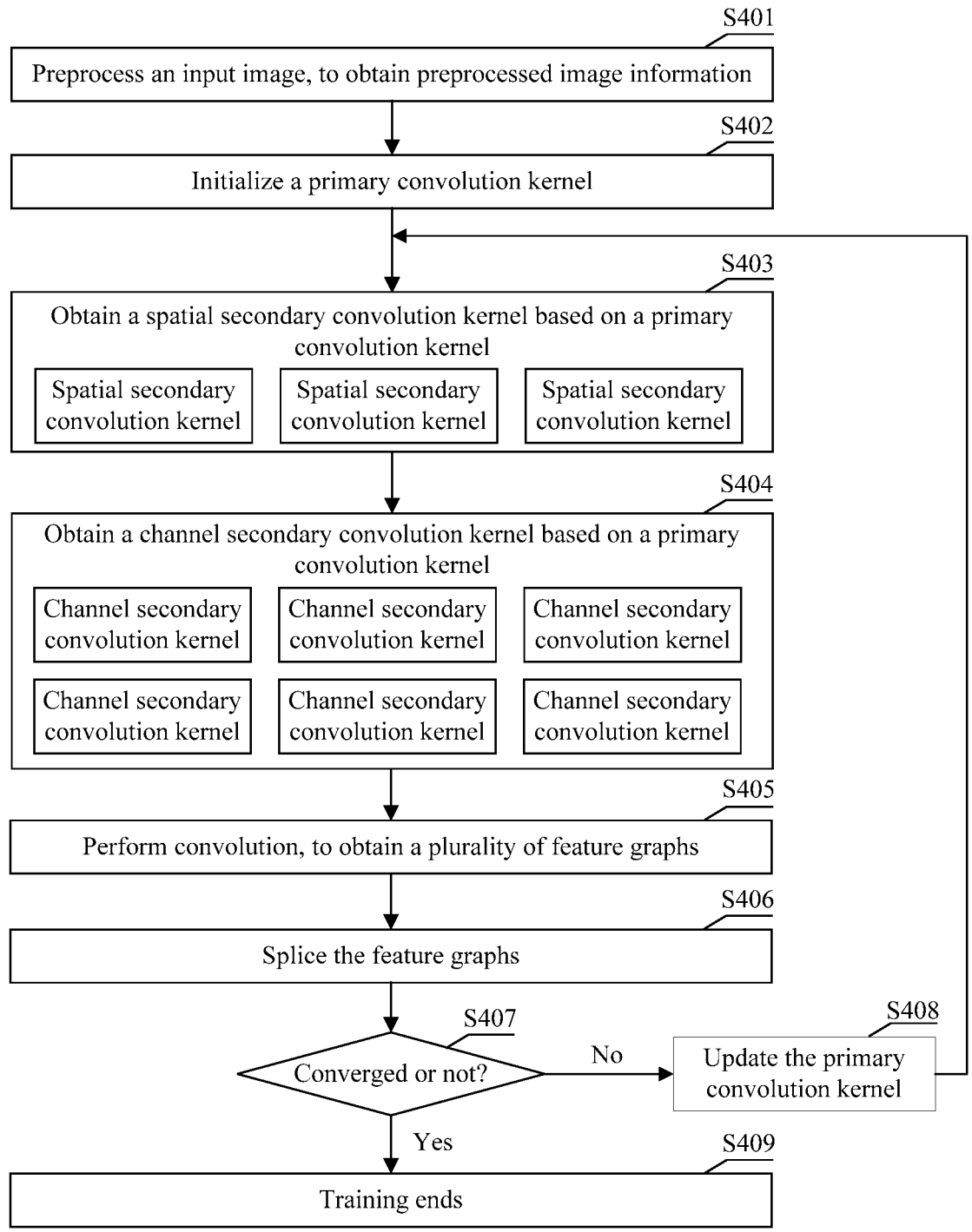
FIG. 4 is a flowchart of a convolutional neural network training method according to an embodiment of this application.

FIG. 4 is a convolutional neural network training method 400 according to Embodiment 1 of the present application. The method may include the following steps.

S401. A training device preprocesses a received input image, to obtain preprocessed image information.

S402. The training device initializes a convolutional neural network.

The initializing a convolutional neural network includes: initializing a primary convolution kernel of each convolution layer in the convolutional neural network and parameters of other layers (for example, a pooling layer, a neural network layer, and a fully connected layer). The training device may initialize the convolutional neural network by using any initialization method, for example, a method such as Gaussian distribution random number sampling or uniform distribution random number sampling.

S403. The training device obtains a spatial secondary convolution kernel based on a primary convolution kernel.

The training device may obtain the spatial secondary convolution kernel based on the primary convolution kernel. The primary convolution kernel may be a primary convolution kernel of any convolution layer in the convolutional neural network. In actual application, the training device may obtain spatial secondary convolution kernels of convolution layers based on primary convolution kernels of the convolution layers. How to obtain a spatial secondary convolution kernel based on a primary convolution kernel is described in detail subsequently. Details are not described herein.

S404. The training device obtains a channel secondary convolution kernel based on a primary convolution kernel.

The training device may obtain the channel secondary convolution kernel based on the primary convolution kernel. The primary convolution kernel may be a primary convolution kernel of any convolution layer in the convolutional neural network. In actual application, the training device may obtain channel secondary convolution kernels of convolution layers based on primary convolution kernels of the convolution layers. How to obtain a channel secondary convolution kernel based on a primary convolution kernel is described in detail subsequently. Details are not described herein.

The primary convolution kernel in S404 may be the same as or different from the primary convolution kernel in S403. The training device may perform only one of S403 and S404. In this case, the primary convolution kernels corresponding to the secondary convolution kernels in S403 and S404 may be the primary convolution kernel in S402. Alternatively, the training device may perform S403 and S404 independently. In this case, both the primary convolution kernels corresponding to the secondary convolution kernels in S403 and S404 may be the primary convolution kernel in S402. Alternatively, the training device may first perform S403 and then perform S404, and the spatial secondary convolution kernel obtained in S403 is the primary convolution kernel corresponding to the channel secondary convolution kernel obtained in S404; or may first perform S404 and then perform S403, and the channel secondary convolution kernel obtained in S404 is the primary convolution kernel corresponding to the spatial secondary convolution kernel obtained in S403.

S405. The training device performs convolution on the image information by using a secondary convolution kernel, to obtain a plurality of feature graphs.

The training device may perform convolution on the image information by using at least the secondary convolution kernel. In other words, the training device may perform convolution on the image information by using the secondary convolution kernel and the primary convolution kernel in step S402, or may perform convolution on the image information by using only the secondary convolution kernel. The secondary convolution kernel may include one or more of the spatial secondary convolution kernel and the channel secondary convolution kernel. Optionally, the training device may perform convolution on the image information by using only the obtained spatial secondary convolution kernel, to obtain the plurality of feature graphs. Optionally, the training device may perform convolution on the image information by using only the obtained channel secondary convolution kernel, to obtain the plurality of feature graphs. Optionally, the training device may perform a convolution operation on the image information by using each spatial secondary convolution kernel, to obtain a part of the plurality of feature graphs; and may perform convolution on the image information by using each channel secondary convolution kernel, to obtain the other part of the plurality of feature graphs. In actual application, the training device may sequentially perform convolution on input image information of each layer according to a specific sequence and by using each convolution layer in the convolutional neural network. For example, an output of a third convolution layer in the convolutional neural network used by the training device is an input of a fourth convolution layer. The training device performs convolution on input image information of the third layer by using convolution kernels (a spatial secondary convolution kernel and a channel secondary convolution kernel) of the third convolution layer, splices obtained feature graphs, and inputs a spliced feature graph into the fourth convolution layer to perform convolution.

S406. The training device splices the plurality of obtained feature graphs in a channel dimension, and uses a spliced feature graph as an output feature graph of a convolution layer.

The channel dimension is the foregoing depth dimension. For example, a convolution layer in the convolutional neural network includes four convolution kernels. The convolution layer is to output an output feature graph including 24 channels. The training device performs a convolution operation on input image information of the convolution layer separately by using the four convolution kernels, to obtain four feature graphs. Each feature graph includes six channels. The four feature graphs are sequentially spliced to obtain an output feature graph of the convolution layer. A $1^{st}$ channel to a $6^{th}$ channel, a $7^{th}$ channel to a $12^{th}$ channel, a $13^{th}$ channel to an $18^{th}$ channel, and a $19^{th}$ channel to a $24^{th}$ channel of the output feature graph are sequentially corresponding to the four feature graphs. In other words, a feature graph obtained by using each convolution kernel is used as a part of the output feature graph of the convolution layer.

S407. The training device determines whether the convolutional neural network is converged.

If the convolutional neural network is converged, S409 is performed; otherwise, S408 is performed. That the training device determines whether the convolutional neural network is converged may be: determining whether a quantity of times of updating the primary convolution kernel reaches an iteration threshold; or may be: determining whether a loss value of the convolutional neural network is lower than a loss threshold. The loss value of the convolutional neural network is an error that is between an ideal result and an image processing result output by the convolutional neural network and that is calculated by the training device by using a loss function of the convolutional neural network. The loss function of the convolutional neural network varies with different training tasks of the training device. The iteration threshold may be a quantity of iteration times that is preset by the training device, for example, 10000 times or 20000 times. The loss threshold may be preset by the training device. If a difference between a real result and an image processing result output by the convolutional neural network is less than the loss threshold, training ends.

S408. The training device calculates gradients of secondary convolution kernels, uses a sum of the gradients of the secondary convolution kernels as a gradient of a primary convolution kernel, and updates a parameter in the primary convolution kernel.

Optionally, the training device calculates gradients of spatial secondary convolution kernels, uses a sum of the gradients of the spatial secondary convolution kernels as the gradient of the primary convolution kernel, and updates the parameter in the primary convolution kernel. Optionally, the training device calculates gradients of channel secondary convolution kernels, uses a sum of the gradients of the channel secondary convolution kernels as the gradient of the primary convolution kernel, and updates the parameter in the primary convolution kernel.

For a primary convolution kernel, a sum of gradients of secondary convolution kernels obtained based on the primary convolution kernel may be used as a gradient of the primary convolution kernel. The secondary convolution kernels may include one or more of a spatial secondary convolution kernel and a channel secondary convolution kernel.

The following uses any convolution layer as an example to describe how to update a parameter in a primary convolution kernel.

A convolution kernel may perform convolution on input image information through matrix multiplication: First, an input feature graph x of a convolution layer (input image information of the convolution layer) may be divided into z blocks, where z=H×W, and a size of each block is (d1×d2× P). The input feature graph includes P channels. Each channel is corresponding to an (H×W) two-dimensional matrix. Both H and W are integers greater than 0. A primary convolution kernel f includes P channels. Each channel is corresponding to a (d1×d2) two-dimensional matrix. All d1, d2, and P are integers greater than 0. Next, each block is vectorized, to obtain a vectorized input feature graph X, where $X=[vec(x_1), vec(x_2), \ldots, vec(x_z)] \in R^{d1d2p \times z}$. Likewise, an output feature graph y and the primary convolution kernel f corresponding to the output feature graph y are also vectorized as $Y=vec(y) \in R^{z \times 1}$ and $F=vec(f) \in R^{d1d2p \times 1}$ respectively. Then the convolution may be recorded as the following formula:

$$Y=X^T F+b$$

where $X^T$ represents transposition of X, b is a bias option of the primary convolution kernel f, a gradient of the output feature graph is represented as ∂L/∂Y, L is the loss function of the entire convolutional neural network, and a gradient $$\frac{\partial L}{\partial X}$$

of X and a gradient $$\frac{\partial L}{\partial F}$$

of F may be calculated by using a backpropagation algorithm:

$$\frac{\partial L}{\partial X} = F\left(\frac{\partial L}{\partial Y}\right)^T$$

$$\frac{\partial L}{\partial F} = X\left(\frac{\partial L}{\partial Y}\right)^T$$

For a secondary convolution kernel, a matrix form of an output feature graph is as follows:

$$Y=[X^T F_1+b_1, X^T F_2+b_2, \ldots, X^T F_s+b_s]$$

where $F_1$ to $F_s$ are s secondary convolution kernels obtained based on the primary convolution kernel f, $b_1$ to $b_s$ are bias options corresponding to $F_1$ to $F_s$ respectively, $Y=[Y_1, Y_2, \ldots, Y_s] \in R^{z \times s}$ is an output feature graph obtained based on the secondary convolution kernels, $Y_1$ to $Y_s$ are feature graphs obtained based on the secondary convolution kernels, and a gradient of the input feature graph is as follows:

$$\frac{\partial L}{\partial X} = \sum_{i=1}^{s}\left[F_i\left(\frac{\partial L}{\partial Y_i}\right)^T\right]$$

A gradient of each secondary convolution kernel is represented as follows:

$$\frac{\partial L}{\partial F_i} = X\left(\frac{\partial L}{\partial Y_i}\right)^T$$

Therefore, a gradient of the primary convolution kernel is a sum of gradients of the secondary convolution kernels:

$$\frac{\partial L}{\partial F} = \sum_{i=1}^{s}\left[\frac{\partial L}{\partial F_i}\right]$$

After the gradient of the primary convolution kernel is calculated, a manner of updating the primary convolution kernel is as follows:

$$F = F - \eta\frac{\partial L}{\partial F}$$

where η is a learning rate. As an important hyperparameter in supervised learning and deep learning, the learning rate determines whether a loss function can be converged to a local minimum value and when the loss function is to be converged to the minimum value. The learning rate is an important hyperparameter for the deep learning. The learning rate controls a speed of adjusting a neural network weight based on a loss gradient. A smaller learning rate indicates a lower speed at which the loss gradient decreases and a longer convergence time. In actual application, different learning rates may be set when the training device performs different processing operations to train the convolutional neural network.

S409. Training ends.

Optionally, the training device repeatedly performs S402 to S408 until a quantity of iteration times that is set by the training device is reached.

The method 400 may be specifically performed by the training device 120 shown in FIG. 1. The input image in the method 400 may be the training data maintained in the database 130 shown in FIG. 1. Optionally, S401 in the method 400 may be performed in the training device 120, or may be pre-performed by another functional module before processing is performed by the training device 120. To be specific, training data received or obtained from the database 130 is first preprocessed, to obtain preprocessed image information, as described in S401. The preprocessed image information is used as an input of the training device 120, and the training device 120 performs S402 to S409.

Optionally, the method 400 may be performed by a CPU, or may be performed by both a CPU and a GPU; or no GPU may be used, but another processor suitable for calculation of a neural network is used. This is not limited in this application.

In this embodiment of this application, the secondary convolution kernels are obtained based on the primary convolution kernel. The gradient of the primary convolution kernel is calculated based on the gradients of the secondary convolution kernels, to further update the primary convolution kernel. The primary convolution kernel used to generate the secondary convolution kernels may be obtained through training, so as to obtain a convolutional neural network with a relatively small parameter amount.

The following describes a solution about how to perform image processing by using a CNN including a small quantity of convolution kernels (primary convolution kernels). In this solution, the CNN includes N convolution layers. Any one of the N convolution layers performs, by using m primary convolution kernels and r secondary convolution kernels obtained based on the m primary convolution kernels, a convolution operation on image information input into the convolution layer. All N, m, and r are integers greater than 0. In this solution, an image processing apparatus may first store primary convolution kernels of the convolution layers in the CNN. Before any convolution layer performs convolution on input image information, a primary convolution kernel of the any convolution layer obtains a plurality of secondary convolution kernels. The any convolution layer then performs a convolution operation on the input image information by using the primary convolution kernel and the secondary convolution kernels. It may be understood that the secondary convolution kernels are obtained based on the primary convolution kernel, but are not prestored by the image processing apparatus. The image processing apparatus may obtain a plurality of secondary convolution kernels based on one primary convolution kernel. All parameters in the secondary convolution kernels may be obtained by sampling some elements in the primary convolution kernel. In this application, the image processing apparatus needs to store only the primary convolution kernels of the convolution layers in the CNN, and before performing a convolution operation by using the convolution layers, obtain the secondary convolution kernels based on the primary convolution kernels of the convolution layers. This can greatly reduce a parameter amount of the convolution kernels in the CNN, so as to reduce a memory space occupied by the CNN.

Embodiment 2

Figure 5:
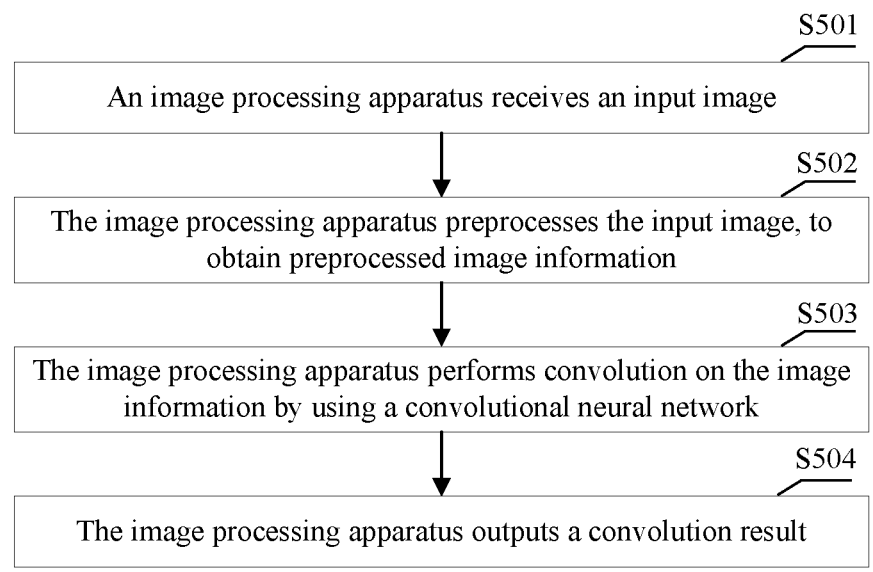
FIG. 5 is a flowchart of an image processing method according to an embodiment of this application.

FIG. 5 is a convolutional neural network-based image processing method 500 according to Embodiment 2 of the present application. The method may include the following steps.

S501. An image processing apparatus receives an input image.

The image processing apparatus is the execution device 110 in FIG. 1. That an image processing apparatus receives an input image may be: obtaining, by the image processing apparatus, an image (the input image) collected by the image processing apparatus by using a data collection device (for example, a camera); or may be: receiving an image from a customer device through the I/O interface 112; or may be: obtaining an image stored in the database 130.

S502. The image processing apparatus preprocesses the input image, to obtain preprocessed image information.

A main objective of preprocessing the input image by the image processing apparatus is to eliminate irrelevant information from the input image, restore useful real information, enhance detectability of relevant information, and maximally simplify data, so as to improve reliability and precision for performing image processing operations, such as feature extraction, image segmentation, image matching, and image recognition, on the input image in a CNN. That the image processing apparatus preprocesses the input image may be: preprocessing the input image by using at least one of the following: image filtering, image enhancement preprocessing, image smoothing preprocessing, and image restoration preprocessing. The image processing apparatus may further perform other image preprocessing operations on the input image. This is not limited in this application. The image filtering mainly includes: adjusting a size of an image, and performs noise cancellation and smoothing processing on noise in an image obtained after zooming. The image enhancement preprocessing is selectively enhancing and suppressing information in an image to improve a visual effect of the image, or transforming an image into a form more suitable for machine processing, to facilitate data extraction or recognition. The image smoothing preprocessing is removing random noise from an image. The image restoration preprocessing is correcting image degradation resulting from various causes, so that a reconstructed or estimated image approaches an ideal non-degraded image as much as possible.

S503. The image processing apparatus performs convolution on the image information by using a convolutional neural network.

The convolutional neural network includes N convolution layers. The convolution includes: performing a convolution operation on the image information by using M convolution kernels at an $n^{th}$ convolution layer. The M convolution kernels include m primary convolution kernels and r secondary convolution kernels. The r secondary convolution kernels are obtained based on the m primary convolution kernels. A plurality of secondary convolution kernels are correspondingly obtained based on one primary convolution kernel. A quantity of non-zero elements included in each of the r secondary convolution kernels is less than a quantity of non-zero elements included in a primary convolution kernel corresponding to the secondary convolution kernel. Both N and M are integers greater than 0. n is an integer greater than 0 and less than or equal to N. m is an integer greater than 0 and less than M. r is an integer greater than 0 and less than M.

Any one of the r secondary convolution kernels includes P channels. A primary convolution kernel corresponding to the any secondary convolution kernel includes Q channels. A two-dimensional matrix, on a $p^{th}$ channel, of the any secondary convolution kernel is a sub-matrix of a two-dimensional matrix, on a $q^{th}$ channel, of the primary convolution kernel corresponding to the any secondary convolution kernel. Both P and Q are integers greater than 0. p is an integer greater than 0 and not greater than P. q is a integer greater than 0 and not greater than Q. The image processing apparatus may obtain the any secondary convolution kernel based on the primary convolution kernel corresponding to the any secondary convolution kernel.

In an optional implementation, the any secondary convolution kernel is obtained by the image processing apparatus by extracting some parameters (elements) in the primary convolution kernel corresponding to the any secondary convolution kernel. In this application, an element in a convolution kernel and a parameter in a convolution kernel are a same concept. In this implementation, each secondary convolution kernel is obtained by sampling some elements in a primary convolution kernel. In other words, a parameter (element) in each secondary convolution kernel is included in a parameter in the primary convolution kernel, and no new parameter is generated. For example, a primary convolution kernel is an (11×11×3) three-dimensional matrix, namely, a three-dimensional tensor. A (9×9×3) three-dimensional matrix included in the primary convolution kernel is a secondary convolution kernel obtained based on the primary convolution kernel. For another example, a primary convolution kernel is a (5×5×96) three-dimensional matrix. To be specific, the primary convolution kernel includes 96 channels, and each channel is corresponding to a (5×5) two-dimensional matrix. A (5×5×93) three-dimensional matrix included in the primary convolution kernel is a secondary convolution kernel obtained based on the primary convolution kernel.

In an optional implementation, the any secondary convolution kernel is obtained by the image processing apparatus by setting, to a target value, some elements in the primary convolution kernel corresponding to the any secondary convolution kernel. The target value may be 0, or may be another value. This is not limited in this application. In this implementation, a secondary convolution kernel and a primary convolution kernel are homotypic matrices. Different secondary convolution kernels may be obtained by setting elements in different locations in a primary convolution kernel to a target value. For example, a primary convolution kernel is an (11×11×3) three-dimensional matrix. A secondary convolution kernel is obtained by setting outermost two rows and outermost two columns of each two-dimensional matrix of the primary convolution kernel in a channel dimension to 0. For another example, a primary convolution kernel includes 96 channels, and each channel is corresponding to one two-dimensional matrix. In other words, the primary convolution kernel includes 96 two-dimensional matrices. A secondary convolution kernel is obtained by setting any three of the 96 two-dimensional matrices to zero matrices.

S504. The image processing apparatus outputs a convolution result.

The convolution result includes M feature graphs. The image processing apparatus may obtain the M feature graphs by performing a convolution operation on the image information separately by using the M convolution kernels at the $n^{th}$ convolution layer, and splice the obtained M feature graphs to obtain the convolution result (an output feature graph of the convolution layer). For example, a convolution layer in the convolutional neural network includes four convolution kernels. The image processing apparatus performs a convolution operation on input image information of the convolution layer separately by using the four convolution kernels, to obtain four feature graphs. If each feature graph includes six channels, the four feature graphs are sequentially spliced to obtain an output feature graph of the convolution layer. A $1^{st}$ channel to a $6^{th}$ channel, a $7^{th}$ channel to a $12^{th}$ channel, a $13^{th}$ channel to an $18^{th}$ channel, and a $19^{th}$ channel to a $24^{th}$ channel of the output feature graph are sequentially corresponding to the four feature graphs. In other words, a feature graph obtained by the image processing apparatus by using convolution kernels of any convolution layer is used as a part of an output feature graph of the any convolution layer. S503 and S504 are operations performed by the image processing apparatus in a process of performing image processing, such as image classification and target detection, on the image information. For example, when the image processing apparatus performs image classification on the image information by using the convolutional neural network, the image processing apparatus needs to perform image classification on the image information by using a convolution layer, a pooling layer, and a neural network layer in the convolutional neural network, to obtain an image classification result.

The method 500 may be specifically performed by the execution device 110 shown in FIG. 1. The input image in S501 in the method 500 may be input data given by the customer device 140 shown in FIG. 1. The preprocessing module 113 in the execution device 110 may be configured to perform preprocessing on the input image, as described in S502 in the method 500. The calculation module 111 in the execution device 110 may be configured to perform S503 and S504.

Optionally, the method 500 may be performed by a CPU, or may be performed by both a CPU and a GPU; or no GPU may be used, but another processor suitable for calculation of a neural network is used. This is not limited in this application.

Embodiment 1 may be understood as a training phase (for example, a phase performed by the training device 120 shown in FIG. 1) of the convolutional neural network. Specifically, training is performed by using the convolutional neural network provided in Embodiment 1. Embodiment 2 may be understood as an application phase (for example, a phase performed by the execution device 110 shown in FIG. 1) of the convolutional neural network, and may be specifically expressed as obtaining an image processing result based on a user-input image by using the convolutional neural network obtained through training in Embodiment 1.

Before performing convolution on input image information by using secondary convolution kernels at any convolution layer in the convolutional neural network, the image processing apparatus needs to obtain the secondary convolution kernels based on a primary convolution kernel of the any convolution layer. The following describes an implementation of obtaining secondary convolution kernels based on any primary convolution kernel at any convolution layer in the convolutional neural network.

Manner 1: The image processing apparatus obtains a spatial secondary convolution kernel based on a primary convolution kernel.

A two-dimensional matrix, on a $p^{th}$ channel, of the spatial secondary convolution kernel includes a sub-matrix of a two-dimensional matrix, on a $q^{th}$ channel, of a primary convolution kernel corresponding to the spatial secondary convolution kernel. The spatial secondary convolution kernel and the primary convolution kernel corresponding to the spatial secondary convolution kernel each include P channels. All p, q, and P are integers greater than 0. A two-dimensional matrix, on any channel, of the spatial secondary convolution kernel includes a sub-matrix of a two-dimensional matrix, on one channel, of the primary convolution kernel. Two-dimensional matrices, one nay two channels, of the spatial secondary convolution kernel are different. The following describes two methods for obtaining a spatial secondary convolution kernel based on a primary convolution kernel.

Method 1: The image processing apparatus obtains a sub-matrix corresponding to a target location in each two-dimensional matrix, in a channel dimension, of a primary convolution kernel, and uses the sub-matrix as a two-dimensional matrix, in a channel dimension, of a spatial secondary convolution kernel.

Each primary convolution kernel includes one or more channels. There is one two-dimensional matrix on each channel. Two-dimensional matrices on all channels are two-dimensional matrices, in a channel dimension, of the primary convolution kernel. A sub-matrix corresponding to a target location in each two-dimensional matrix is any sub-matrix in each two-dimensional matrix. Optionally, an element in a target location in each two-dimensional matrix is an element other than elements in outermost K rows and outermost K columns in each two-dimensional matrix. K is an integer not less than 1.

In an optional implementation, any primary convolution kernel includes P channels. A spatial secondary convolution kernel obtained based on the any primary convolution kernel includes P channels. The image processing apparatus may use sub-matrices corresponding to target locations in two-dimensional matrices, on a $1^{st}$ channel to a $P^{th}$ channel, of the any primary convolution kernel as two-dimensional matrices, on a $1^{st}$ channel to a $P^{th}$ channel, of the spatial secondary convolution kernel respectively. For example, a primary convolution kernel includes P channels: a $1^{st}$ channel to a $P^{th}$ channel. A two-dimensional matrix on each channel is a (7×7) matrix. The image processing apparatus obtains a (5×5) sub-matrix in each two-dimensional matrix on the $1^{st}$ channel to the $P^{th}$ channel included in the primary convolution kernel, and uses the sub-matrix as a two-dimensional matrix on a $1^{st}$ channel to a $P^{th}$ channel included in a spatial secondary convolution kernel.

In an optional implementation, any primary convolution kernel includes P channels. A spatial secondary convolution kernel obtained based on the any primary convolution kernel includes P channels. The image processing apparatus may use a sub-matrix corresponding to a target location in a two-dimensional matrix, on a $q^{th}$ channel, of the any primary convolution kernel as a two-dimensional matrix, on a $p^{th}$ channel, of the spatial secondary convolution kernel obtained based on the any primary convolution kernel. All P, p, and q are integers greater than 0. p is not equal to q. For example, a primary convolution kernel includes three channels. The image processing apparatus uses a sub-matrix of a two-dimensional matrix, on a first channel, of the primary convolution kernel as a two-dimensional matrix, on a second channel, of a spatial secondary convolution kernel; uses a sub-matrix of a two-dimensional matrix, on a second channel, of the primary convolution kernel as a two-dimensional matrix, on a third channel, of the spatial secondary convolution kernel; and uses a sub-matrix of a two-dimensional matrix, on a third channel, of the primary convolution kernel as a two-dimensional matrix, on a first channel, of the spatial secondary convolution kernel.

In an optional implementation, the image processing apparatus may obtain elements in different locations in each of P two-dimensional matrices, to obtain a spatial secondary convolution kernel. The P two-dimensional matrices are two-dimensional matrices on P channels included in any primary convolution kernel. An element included in a two-dimensional matrix, on a $p1^{th}$ channel, of the spatial secondary convolution kernel is an element in a first location in a two-dimensional matrix, on a $q1^{th}$ channel, of the any primary convolution kernel. An element included in a two-dimensional matrix, on a $p2^{th}$ channel, of the secondary convolution kernel is an element in a second location in a two-dimensional matrix, on a $q2^{th}$ channel, of the any primary convolution kernel. The first location is different from the second location. The spatial secondary convolution kernel includes P channels. P is greater than 0. All p1, p2, q1, and q2 are integers greater than 0 and not greater than P. The image processing apparatus may use a sub-matrix corresponding to the element in the first location in the two-dimensional matrix, on the $q1^{th}$ channel, of the any primary convolution kernel as the two-dimensional matrix, on the $p1^{th}$ channel, of the spatial secondary convolution kernel; and use a sub-matrix corresponding to the element in the second location in the two-dimensional matrix, on the $q2^{th}$ channel, of the any primary convolution kernel as the two-dimensional matrix, on the $p2^{th}$ channel, of the spatial secondary convolution kernel. For example, for a (3×3×256) primary convolution kernel, there is one (3×3) two-dimensional matrix on each channel. A two-dimensional matrix on a first channel of a spatial secondary convolution kernel obtained based on the primary convolution kernel is a (2×2) matrix in an upper left corner of a two-dimensional matrix on a first channel of the primary convolution kernel. A two-dimensional matrix on a second channel of the spatial secondary convolution kernel is a (2×2) matrix in a lower right corner of a two-dimensional matrix on a second channel of the primary convolution kernel. It may be understood that the image processing apparatus may extract elements in different locations in a two-dimensional matrix, on each channel, of the any primary convolution kernel, to obtain a secondary convolution kernel.

Figure 6A:
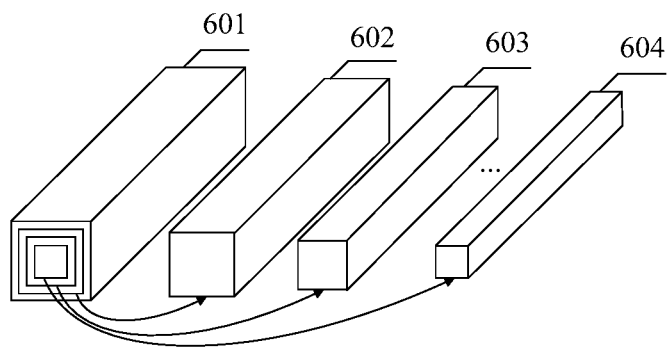
FIG. 6A is a schematic diagram of a comparison between a primary convolution kernel and a secondary convolution kernel according to an embodiment of this application.

The image processing apparatus may obtain a plurality of spatial secondary convolution kernels based on any primary convolution kernel. The image processing apparatus may obtain an element in a third location in each of P two-dimensional matrices, to obtain a first secondary convolution kernel; and obtain an element in a fourth location in each of P two-dimensional matrices, to obtain a second secondary convolution kernel. If the third location is different from the fourth location, the first secondary convolution kernel is different from the second secondary convolution kernel. The P two-dimensional matrices are two-dimensional matrices, on P channels, of any primary convolution kernel. A location of an element in each two-dimensional matrix obtained by the image processing apparatus is not limited in this application. In other words, a target location is not limited. FIG. 6A is a schematic diagram of a comparison between a primary convolution kernel and a secondary convolution kernel according to an embodiment of this application. As shown in FIG. 6A, 601 is a primary convolution kernel, and all 602, 603, and 604 are spatial secondary convolution kernels obtained based on the primary convolution kernel 601. It can be learned from FIG. 6A that all the spatial secondary convolution kernel 602, the spatial secondary convolution kernel 603, and the spatial secondary convolution kernel 604 are included in the primary convolution kernel 601. A two-dimensional matrix on each channel of a spatial secondary convolution kernel obtained based on any primary convolution kernel is obtained based on a two-dimensional matrix on each channel of the any primary convolution kernel in a same manner. The following uses a two-dimensional matrix on a channel of the any primary convolution kernel as an example to describe how to obtain one or more spatial secondary convolution kernels based on any primary convolution kernel.

Figure 6B:
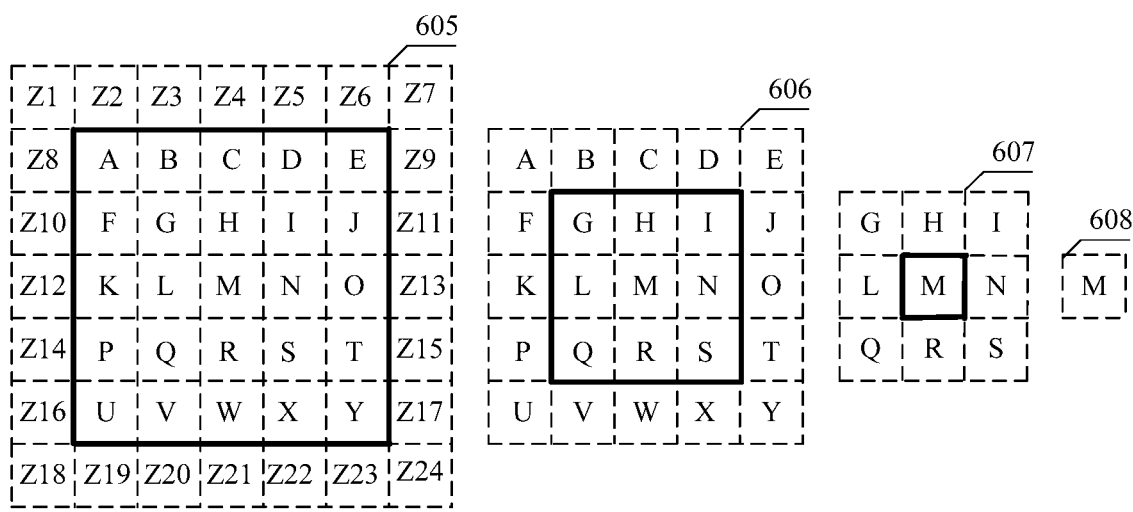
FIG. 6B is another schematic diagram of a comparison between a primary convolution kernel and a secondary convolution kernel according to an embodiment of this application.

FIG. 6B is another schematic diagram of a comparison between a primary convolution kernel and a secondary convolution kernel according to an embodiment of this application. Four matrices included in FIG. 6B are two-dimensional matrices, on a $p^{th}$ channel, of the four convolution kernels included in FIG. 6A. As shown in FIG. 6B, 605 is a two-dimensional matrix, on a $p^{th}$ channel, of the primary convolution kernel 601; 606 is a two-dimensional matrix, on a $p^{th}$ channel, of the spatial secondary convolution kernel 602; 607 is a two-dimensional matrix, on a $p^{th}$ channel, of the spatial secondary convolution kernel 603; and 608 is a two-dimensional matrix, on a $p^{th}$ channel, of the spatial secondary convolution kernel 604. It can be learned from FIG. 6B that all 606, 607, and 608 are sub-matrices included in 605. In FIG. 6B, matrices corresponding to three black solid-line boxes from left to right are sequentially the two-dimensional matrix, on the $p^{th}$ channel, of the spatial secondary convolution kernel 602, the two-dimensional matrix, on the $p^{th}$ channel, of the spatial secondary convolution kernel 603, and the two-dimensional matrix, on the $p^{th}$ channel, of the spatial secondary convolution kernel 604.

The following describes a method for obtaining a plurality of spatial secondary convolution kernels based on any primary convolution kernel. The image processing apparatus may obtain an element, other than elements in outermost two rows and outermost two columns, in each two-dimensional matrix of any primary convolution kernel in a channel dimension, to obtain a spatial secondary convolution kernel; and extract an element, other than elements in outermost four rows and outermost four columns, in each two-dimensional matrix, to obtain another spatial secondary convolution kernel. It may be understood that the image processing apparatus may obtain a series of spatial secondary convolution kernels based on the any primary convolution kernel in a similar manner, until a quantity of obtained spatial secondary convolution kernels meets a requirement. If any primary convolution kernel or a two-dimensional matrix, on a channel, of the any primary convolution kernel is a (d1×d2) matrix, the image processing apparatus may obtain a maximum of (s−1) spatial secondary convolution kernels in this manner, where s=⌈d/2⌉, d=min(d1, d2), d is a smaller number in d1 and d2, and "⌈ ⌉" is a rounding-up symbol.

The image processing apparatus may obtain, based on a primary convolution kernel by using the method 1, a spatial secondary convolution kernel that has a smaller size than the primary convolution kernel. This can quickly obtain a required spatial secondary convolution kernel, and can also improve calculation efficiency.

Method 2: The image processing apparatus sets, to a target value, all elements in locations other than a target location in each two-dimensional matrix, in a channel dimension, of a primary convolution kernel.

The target value may be 0, or may be another value. Usually, the target value is 0. This is not limited in this application. Optionally, an element other than an element in a target location in each two-dimensional matrix is an element other than elements in outermost K rows and outermost K columns in each two-dimensional matrix. K is an integer not less than 1. The image processing apparatus may set, to a target value, at least one element in a two-dimensional matrix on any channel of any primary convolution kernel, to obtain a spatial secondary convolution kernel.

In an optional implementation, the image processing apparatus sets, to a target value, an element other than an element in a target location in each of P two-dimensional matrices, to obtain a spatial secondary convolution kernel. The P two-dimensional matrices are P two-dimensional matrices on P channels included in any primary convolution kernel. The spatial secondary convolution kernel includes P channels. P is an integer greater than 0. The image processing apparatus may set, to a target value, an element in a fifth location in each of the P two-dimensional matrices, to obtain a spatial secondary convolution kernel; and set, to the target value, an element in a sixth location in each of the P two-dimensional matrices, to obtain another spatial secondary convolution kernel. If the fifth location is different from the sixth location, the two spatial secondary convolution kernels are different. Optionally, the image processing apparatus sets, to a target value, an element other than elements in outermost K rows and outermost K columns in each of the P two-dimensional matrices; or may set, to a target value, an element in another location in each two-dimensional matrix. This is not limited in this application. K is an integer not less than 1.

Figure 7:
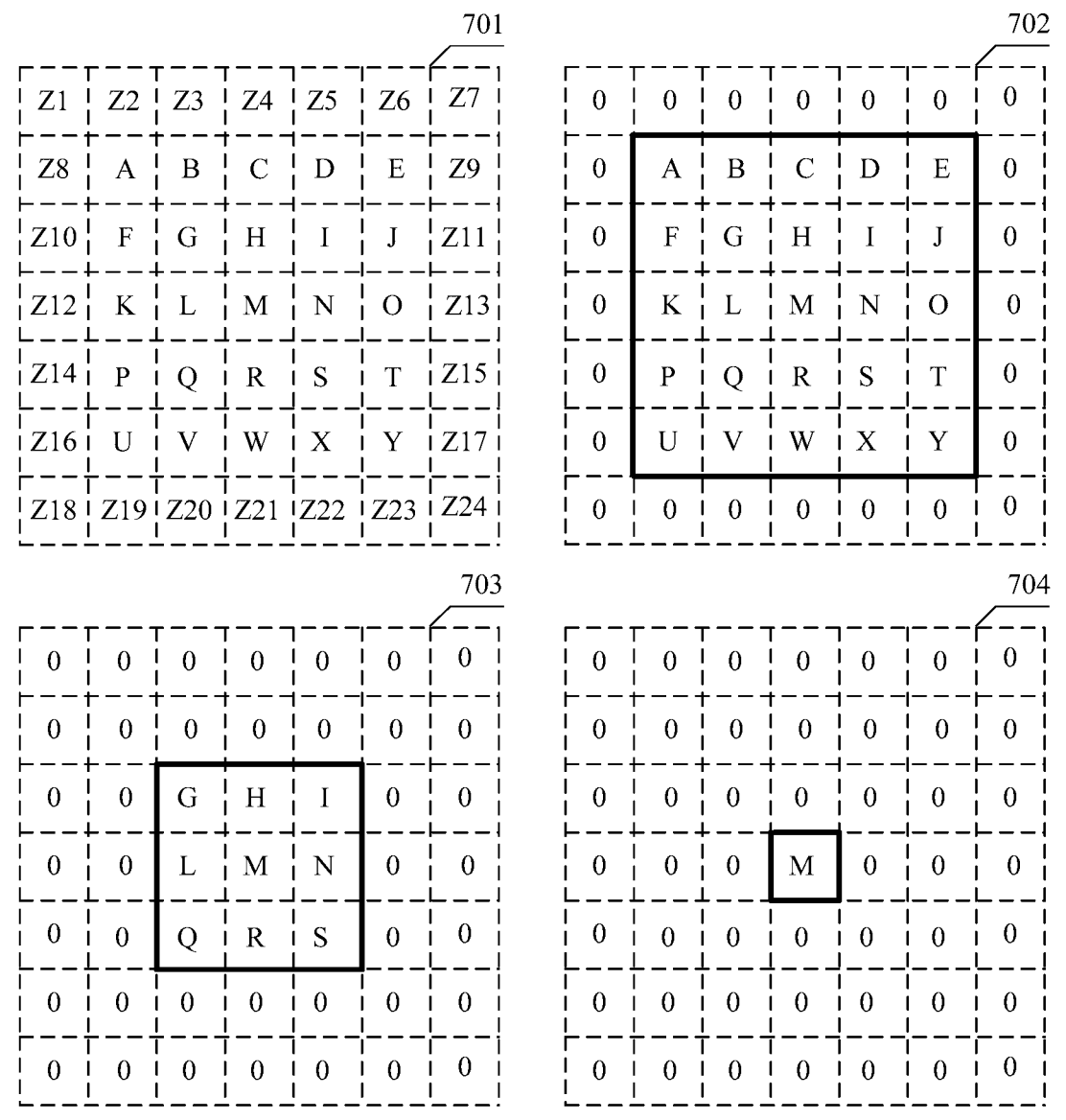

The following describes a method for obtaining a plurality of spatial secondary convolution kernels based on any primary convolution kernel. The image processing apparatus may set, to a target value, outermost two rows and outermost two columns in each two-dimensional matrix of any primary convolution kernel in a channel dimension, to obtain a first secondary convolution kernel; set, to the target value, outermost four rows and outermost four columns in each two-dimensional matrix, to obtain a second secondary convolution kernel; and set, to the target value, outermost 2(s−1) rows and outermost 2(s−1) columns in each two-dimensional matrix, to obtain an $s^{th}$ secondary convolution kernel. If any primary convolution kernel or a two-dimensional matrix of the any primary convolution kernel in a channel dimension is a (d1×d2) matrix, the image processing apparatus may obtain a maximum of (s−1) secondary convolution kernels by using this method, where s=⌈d/2⌉, d=min(d1, d2), d is a smaller number in d1 and d2, and "⌈ ⌉" in is a rounding-up symbol. The image processing apparatus may set, to a target value in a similar manner, an element in a same location in each two-dimensional matrix of any primary convolution kernel in a channel dimension, to obtain a spatial secondary convolution kernel. The following uses a two-dimensional matrix on a channel of the any primary convolution kernel as an example to describe how to obtain one or more secondary convolution kernels based on any primary convolution kernel. FIG. 7 is still another schematic diagram of a comparison between a primary convolution kernel and a secondary convolution kernel according to an embodiment of this application. As shown in FIG. 7, 701 is a two-dimensional matrix, on a $t^{th}$ channel, of a primary convolution kernel. 702, 703, and 704 are two-dimensional matrices, on a $t^{th}$ channel, of spatial secondary convolution kernels obtained based on the primary convolution kernel. t is an integer greater than 0. It can be learned from FIG. 7 that the image processing apparatus may obtain a homotypic spatial secondary convolution kernel of a primary convolution kernel by setting, to 0, one or more outermost rows and one or more outermost columns in each two-dimensional matrix of the primary convolution kernel in a channel dimension.

The following provides a manner of setting, to a target value, an element other than an element in a target location in each two-dimensional matrix of a primary convolution kernel in a channel dimension, to obtain a spatial secondary convolution kernel.

The image processing apparatus calculates a product of an element in a location in a sampling matrix and an element in a corresponding location in any primary convolution kernel, to obtain a spatial secondary convolution kernel. The sampling matrix and the any primary convolution kernel are homotypic matrices, and elements in all locations in the sampling matrix are in a one-to-one correspondence with elements in all locations in the primary convolution kernel. An element in a target location in the sampling matrix is 1, and all elements in locations other than the target location are 0. The element in the target location in the sampling matrix may be an element other than elements in outermost K rows and outermost K columns in each two-dimensional matrix of the sampling matrix in a channel dimension. K is an integer not less than 1.

In an optional implementation, a sampling matrix and any primary convolution kernel are homotypic matrices. All elements included in outermost K rows and outermost K columns in each two-dimensional matrix of the sampling matrix in a channel dimension are 0, and all elements other than these elements in the sampling matrix are 1. The image processing apparatus calculates a product of an element in a location in the sampling matrix and an element in a corresponding location in the any primary convolution kernel, to obtain a spatial secondary convolution kernel. It may be understood that a spatial secondary convolution kernel obtained by calculating a product of any primary convolution kernel and a sampling matrix is the same as a spatial secondary convolution kernel obtained by setting, to 0, all elements included in outermost K rows and outermost K columns in each two-dimensional matrix of the any primary convolution kernel in a channel dimension. The image processing apparatus may separately calculate products of any primary convolution kernel and a plurality of different sampling matrices, to obtain a plurality of spatial secondary convolution kernels. In this implementation, a mathematical expression of a sampling matrix is as follows:

$$M_i(a, b, :) = \begin{cases} 1, & \text{if } a, b \geq i \mid a, b \leq d + 1 - i \\ 0, & \text{otherwise} \end{cases}$$

where the sampling matrix $M_i$ is a (d1×d2×Q) three-dimensional matrix, i is an integer not less than 1, d is a smaller number in d1 and d2, $M_i(a, b, :)$ represents a row a and a column b in each two-dimensional matrix of the sampling matrix $M_i$ in a channel dimension, the sampling matrix $M_i$ is an $i^{th}$ sampling matrix corresponding to any primary convolution kernel, the sampling matrix $M_i$ and the any primary convolution kernel are homotypic matrices, Q is a quantity of channels of the sampling matrix $M_i$, and the image processing apparatus may calculate a product of an element in a location in the sampling matrix and an element in a corresponding location in the any primary convolution kernel by using the following formula:

$$f_i = M_i \circ f$$

where $f_i$ is an $i^{th}$ spatial secondary convolution kernel obtained based on the any primary convolution kernel, f is the any primary convolution kernel, and "∘" represents multiplication of elements in corresponding locations in two matrices. If the any primary convolution kernel or a two-dimensional matrix, on a channel, of the any primary convolution kernel is a (d1×d2) matrix, the any primary convolution kernel is corresponding to a maximum of (s−1) sampling matrices, where s=⌈d/2⌉, d=min(d1, d2), d is a smaller number in d1 and d2, and "⌈⌉" is a rounding-up symbol. The image processing apparatus may obtain (s−1) spatial secondary convolution kernels by separately calculating products of the any primary convolution kernel and elements in corresponding locations in the (s−1) sampling matrices.

The image processing apparatus may obtain a homotypic spatial secondary convolution kernel of a primary convolution kernel based on the primary convolution kernel by using the method 2. Implementation is simple.

Manner 2: The image processing apparatus obtains a channel secondary convolution kernel based on a primary convolution kernel.

A two-dimensional matrix, on a $p^{th}$ channel, of a channel secondary convolution kernel is a sub-matrix of a two-dimensional matrix, on a ($i^{th}$ channel, of a primary convolution kernel corresponding to the channel secondary convolution kernel. Both p and q are integers greater than 0. The channel secondary convolution kernel includes P channels. The primary convolution kernel corresponding to the channel secondary convolution kernel includes Q channels. Both P and Q and integers greater than 0, and P is not equal to Q.

The following describes two methods for obtaining a channel secondary convolution kernel based on a primary convolution kernel.

Method 1: The image processing apparatus obtains a two-dimensional matrix on any P channels of Q channels included in a primary convolution kernel, to obtain a channel secondary convolution kernel. Q is an integer greater than 0. The channel secondary convolution kernel includes P channels. P is an integer greater than 0 and less than Q.

Optionally, the P channels may be P contiguous channels in the Q channels. Assuming that channels included in a primary convolution kernel are sequentially a $1^{st}$ channel to a $Q^{th}$ channel, a $u^{th}$ channel to a $(P+u-1)^{th}$ channel are P contiguous channels. (P+u−1) is not greater than Q. u is an integer greater than 0.

Optionally, P is equal to 1. The image processing apparatus uses a two-dimensional matrix on any channel of the any primary convolution kernel as a two-dimensional matrix on a first channel of a channel secondary convolution kernel.

Optionally, P is greater than 1. The image processing apparatus uses a two-dimensional matrix on any channel of the any primary convolution kernel as a two-dimensional matrix on each of T channels of a channel secondary convolution kernel. T is an integer greater than 1 and less than or equal to P. For example, the image processing apparatus may use a two-dimensional matrix on a first channel of the primary convolution kernel as a two-dimensional matrix on each of a $1^{st}$ channel to a $48^{th}$ channel of the channel secondary convolution kernel; and use a two-dimensional matrix on a second channel of the primary convolution kernel as a two-dimensional matrix on each of a $49^{th}$ channel to a $96^{th}$ channel of the channel secondary convolution kernel. It may be understood that all two-dimensional matrices on all channels of a channel secondary convolution kernel come from a primary convolution kernel corresponding to the channel secondary convolution kernel.

The following describes a method for obtaining a plurality of channel secondary convolution kernels based on any primary convolution kernel. The image processing apparatus may sequentially use P two-dimensional matrices on a $1^{st}$ channel to a $P^{th}$ channel of any primary convolution kernel as two-dimensional matrices on a $1^{st}$ channel to a $P^{th}$ channel of a first channel secondary convolution kernel, sequentially use P two-dimensional matrices on a $(1+g)^{th}$ channel to a $(P+g)^{th}$ channel of the any primary convolution kernel as two-dimensional matrices on a $1^{st}$ channel to a $P^{th}$ channel of a second channel secondary convolution kernel, and sequentially use P two-dimensional matrices on a $(1+g*(f-1))^{th}$ channel to a $(P+g*(f-1))^{th}$ channel of the any primary convolution kernel as two-dimensional matrices on a $1^{st}$ channel to a $P^{th}$ channel of an $f^{th}$ channel secondary convolution kernel. g is an integer greater than 0, and may be understood as a stride of a channel secondary convolution kernel, namely, a stride used when the image processing apparatus performs sampling on a channel of a primary convolution kernel. f is an integer greater than 1 and less than or equal to ((Q−P)/g+1).

Figure 8:
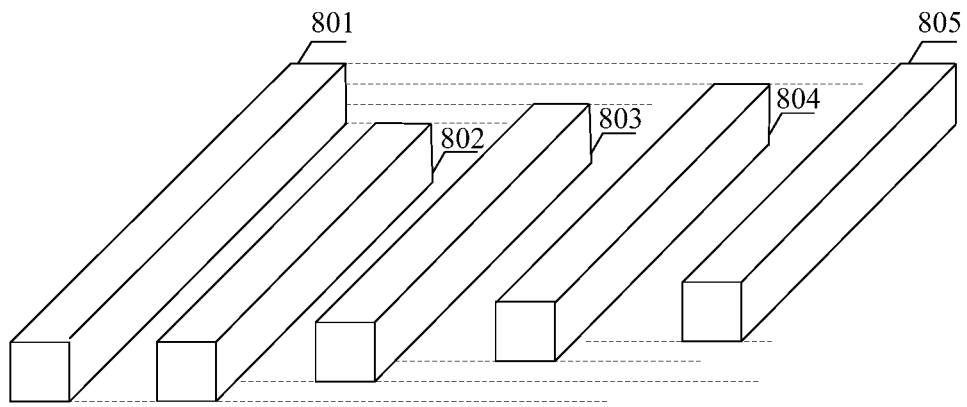
FIG. 8 is still another schematic diagram of a comparison between a primary convolution kernel and a secondary convolution kernel according to an embodiment of this application.

A two-dimensional matrix, on a $p^{th}$ channel, of a channel secondary convolution kernel obtained based on any primary convolution kernel is a matrix, on a $q^{th}$ channel, of the any primary convolution kernel. Both p and q are integers greater than 0. For example, a primary convolution kernel includes 96 channels. There is one two-dimensional matrix on each channel. A secondary convolution kernel obtained based on the primary convolution kernel includes 93 channels. The image processing apparatus may sequentially use 93 two-dimensional matrices on a $1^{st}$ channel to a $93^{rd}$ channel in the 96 channels as two-dimensional matrices on a 1$^{st}$ channel to a 93$^{rd}$ channel of a first channel secondary convolution kernel; sequentially use 93 two-dimensional matrices on a 2$^{nd}$ channel to a 94$^{th}$ channel in the 96 channels as two-dimensional matrices on a 1$^{st}$ channel to a 93$^{rd}$ channel of a second channel secondary convolution kernel; sequentially use 93 two-dimensional matrices on a 3$^{rd}$ channel to a 95$^{th}$ channel in the 96 channels as two-dimensional matrices on a 1$^{st}$ channel to a 93$^{rd}$ channel of a third channel secondary convolution kernel; and sequentially use 93 two-dimensional matrices on a 4$^{th}$ channel to a 96$^{th}$ channel in the 96 channels as two-dimensional matrices on a 1$^{st}$ channel to a 93$^{rd}$ channel of a fourth channel secondary convolution kernel. FIG. 8 is still another schematic diagram of a comparison between a primary convolution kernel and a secondary convolution kernel according to an embodiment of this application. As shown in FIG. 8, 801 is a primary convolution kernel, 802 is a first channel secondary convolution kernel, 803 is a second channel secondary convolution kernel, 804 is a third channel secondary convolution kernel, and 805 is a fourth channel secondary convolution kernel. All these channel secondary convolution kernels are obtained by the image processing apparatus by obtaining two-dimensional matrices on a plurality of contiguous channels of the primary convolution kernel 801. A quantity of channels included in a channel secondary convolution kernel obtained based on any primary convolution kernel is less than a quantity of channels included in the any primary convolution kernel. In other words, a size of the channel secondary convolution kernel is less than a size of the primary convolution kernel. A speed of performing a convolution operation by using the channel secondary convolution kernel is higher.

Method 2: The image processing apparatus sets, to a target value, all elements in a two-dimensional matrix on any one or more of Q channels included in a primary convolution kernel, to obtain a channel secondary convolution kernel. Q is an integer greater than 0. The target value may be 0 or another value.

In an optional implementation, the image processing apparatus sets, to zero matrices, all (Q−P) two-dimensional matrices on any (Q−P) of Q channels included in any primary convolution kernel, to obtain a channel secondary convolution kernel. The (Q−P) channels may be (Q−P) contiguous channels in the Q channels. Q is an integer greater than 0. P is an integer greater than 0 and less than Q. The image processing apparatus may obtain a plurality of channel secondary convolution kernels based on one primary convolution kernel in a similar manner. The following describes a method for obtaining a plurality of channel secondary convolution kernels based on any primary convolution kernel. The image processing apparatus may set, to zero matrices, all two-dimensional matrices on all channels, other than a 1$^{st}$ channel to a P$^{th}$ channel, of any primary convolution kernel, to obtain a first channel secondary convolution kernel; set, to zero matrices, all two-dimensional matrices on all channels, other than a (1+g)$^{th}$ channel to a (P+g)$^{th}$ channel, of the any primary convolution kernel, to obtain a second channel secondary convolution kernel; and set, to zero matrices, all two-dimensional matrices on all channels, other than a (1+g*(u−1))$^{th}$ channel to a (P+g*(u−1))$^{th}$ channel, of the any primary convolution kernel, to obtain a u$^{th}$ channel secondary convolution kernel. g is an integer greater than 0, and may be understood as a stride of a channel secondary convolution kernel. u is an integer greater than 1 and less than or equal to ((P−H)/g+1).

The following provides a manner of setting, to a zero matrix, one or more two-dimensional matrices of any primary convolution kernel in a channel dimension, to obtain a channel secondary convolution kernel.

In an optional implementation, a sampling matrix and any primary convolution kernel are homotypic matrices. All (Q−P) two-dimensional matrices on (Q−P) of Q channels of the sampling matrix are zero matrices. All elements in a two-dimensional matrix on a channel other than the (Q−P) channels in the sampling matrix are 1. Q is an integer greater than 0. P is an integer greater than 0 and less than Q. The image processing apparatus calculates a product of an element in a location in the sampling matrix and an element in a corresponding location in the any primary convolution kernel, to obtain a channel secondary convolution kernel. The image processing apparatus may separately calculate products of any primary convolution kernel and a plurality of different sampling matrices, to obtain a plurality of channel secondary convolution kernels. In this implementation, a mathematical expression of the sampling matrix is as follows:

$$M_j(:,:,l) = \begin{cases} 1, & \text{if } l \geq g \cdot (j-1)+1 \mid l \leq g \cdot (j-1)+M \\ 0, & \text{otherwise} \end{cases}$$

where the sampling matrix $M_j$ is a (d1×d2×Q) three-dimensional matrix, j is an integer not less than 1, g is an integer greater than 0, the sampling matrix $M_j$ is a j$^{th}$ sampling matrix corresponding to any primary convolution kernel, the sampling matrix $M_j$ and the any primary convolution kernel are homotypic matrices, Q is a quantity of channels included in the sampling matrix $M_j(:,:,l)$ $M_j(:,:,l)$ represents all elements in a two-dimensional matrix, on a first channel, of the sampling matrix $M_j$, and the image processing apparatus calculates a product of an element in a location in the sampling matrix and an element in a corresponding location in the any primary convolution kernel by using the following formula:

$$f_j = M_j \circ f$$

where $f_j$ is a j$^{th}$ secondary convolution kernel obtained based on the any primary convolution kernel, and "∘" represents multiplication of elements in corresponding locations in two matrices. In this implementation, the any primary convolution kernel is corresponding to a maximum of ($\lfloor(Q-P)/g\rfloor+1$) sampling matrices. (Q−P) is a quantity of zero matrices included in any sampling matrix in a channel dimension. g is an integer greater than 0, and may be understood as a stride of a channel secondary convolution kernel. "$\lfloor\ \rfloor$" is a rounding-down symbol. In this implementation, a secondary convolution kernel obtained by the image processing apparatus based on any primary convolution kernel is a channel secondary convolution kernel.

The image processing apparatus may prestore a plurality of sampling matrices corresponding to the any primary convolution kernel, and obtain a plurality of channel secondary convolution kernels by using the sampling matrices and the any primary convolution kernel. The image processing apparatus can quickly obtain a plurality of channel secondary convolution kernels different from a primary convolution kernel, by calculating a product of an element in a location in a sampling matrix and an element in a corresponding location in the primary convolution kernel to obtain a channel secondary convolution kernel. Implementation is simple.

Manner 3: The image processing apparatus uses, as a new primary convolution kernel, a secondary convolution kernel obtained based on a primary convolution kernel, and obtains a new secondary convolution kernel based on the new primary convolution kernel.

In an optional implementation, the image processing apparatus may first obtain a plurality of spatial secondary convolution kernels based on one or more primary convolution kernels, and then use the spatial secondary convolution kernels as new primary convolution kernels to obtain channel secondary convolution kernels. For example, the image processing apparatus obtains four spatial secondary convolution kernels based on one primary convolution kernel, and obtains three channel secondary convolution kernels by using each spatial secondary convolution kernel as a new primary convolution kernel. In this way, 12 secondary convolution kernels can be obtained.

In an optional implementation, the image processing apparatus may first obtain a plurality of channel secondary convolution kernels based on one or more primary convolution kernels, and then use the channel secondary convolution kernels as new primary convolution kernels to obtain spatial secondary convolution kernels. For example, the image processing apparatus obtains four channel secondary convolution kernels based on one primary convolution kernel, and obtains three spatial secondary convolution kernels by using each channel secondary convolution kernel as a new primary convolution kernel. In this way, 12 secondary convolution kernels can be obtained.

In the manner 3, the image processing apparatus uses a generated secondary convolution kernel as a new primary convolution kernel to generate another secondary convolution kernel. This can not only resolve a problem that a quantity of secondary convolution kernels generated based on one primary convolution kernel is limited, but also more fully utilize the primary convolution kernel, and further reduce a parameter amount in a CNN.

A parameter amount of a secondary convolution kernel obtained by the image processing apparatus in any one of the foregoing manners is less than or equal to that of a primary convolution kernel corresponding to the secondary convolution kernel. Therefore, calculation complexity for performing a convolution operation by using each secondary convolution kernel is not higher than calculation complexity of the primary convolution kernel. In other words, a secondary convolution kernel obtained in the foregoing manners may reduce calculation complexity of convolution calculation and improve calculation efficiency.

In this application, the image processing apparatus may alternatively obtain a secondary convolution kernel based on any primary convolution kernel in another manner. Manners of obtaining a secondary convolution kernel based on a primary convolution kernel are not limited to the foregoing three manners. It should be understood that a solution for obtaining a secondary convolution kernel based on a primary convolution kernel in another manner also falls within the protection scope of this application.

The foregoing embodiments describe a plurality of implementations of obtaining a secondary convolution kernel based on a primary convolution kernel. The following describes a process of storing and using a secondary convolution kernel obtained based on a primary convolution kernel.

In an optional implementation, after obtaining a secondary convolution kernel based on a primary convolution kernel, the image processing apparatus directly performs a convolution operation on image information by using the obtained secondary convolution kernel, and stores an obtained feature graph. In this implementation, the image processing apparatus directly performs a convolution operation by using secondary convolution kernels obtained by performing sampling or adjustment on a primary convolution kernel, without a need of storing the secondary convolution kernels. This can effectively reduce storage overheads.

In an optional implementation, after obtaining secondary convolution kernels based on a primary convolution kernel of any convolution layer in a convolutional neural network, the image processing apparatus stores the obtained secondary convolution kernels; and after completing convolution calculation at the any convolution layer by using the secondary convolution kernels, clears the stored secondary convolution kernels, and continues to perform a convolution operation at a next convolution layer. For example, when performing a convolution operation at a first convolution layer in the convolutional neural network, the image processing apparatus obtains a secondary convolution kernel based on a primary convolution kernel of the first convolution layer, performs a convolution operation on input image information by using the primary convolution kernel and the secondary convolution kernel of the first convolution layer, and stores an obtained feature graph. Before performing a convolution operation at a second convolution layer in the convolutional neural network, the image processing apparatus clears the stored secondary convolution kernel of the first convolution layer. When performing a convolution operation at the second convolution layer in the convolutional neural network, the image processing apparatus obtains a secondary convolution kernel based on a primary convolution kernel of the second convolution layer, stores the obtained secondary convolution kernel, performs a convolution operation on input image information by using the primary convolution kernel and the secondary convolution kernel of the second convolution layer, and stores an obtained feature graph. The image processing apparatus repeats the foregoing operations until convolution operations at all convolution layers are completed. In this implementation, the image processing apparatus does not need to simultaneously store secondary convolution kernels of the convolution layers, but sequentially stores the secondary convolution kernels of each convolution layer in a process of performing a convolution operation at the convolution layers. This can effectively reduce a storage space occupied by convolution kernels.

Figure 9:
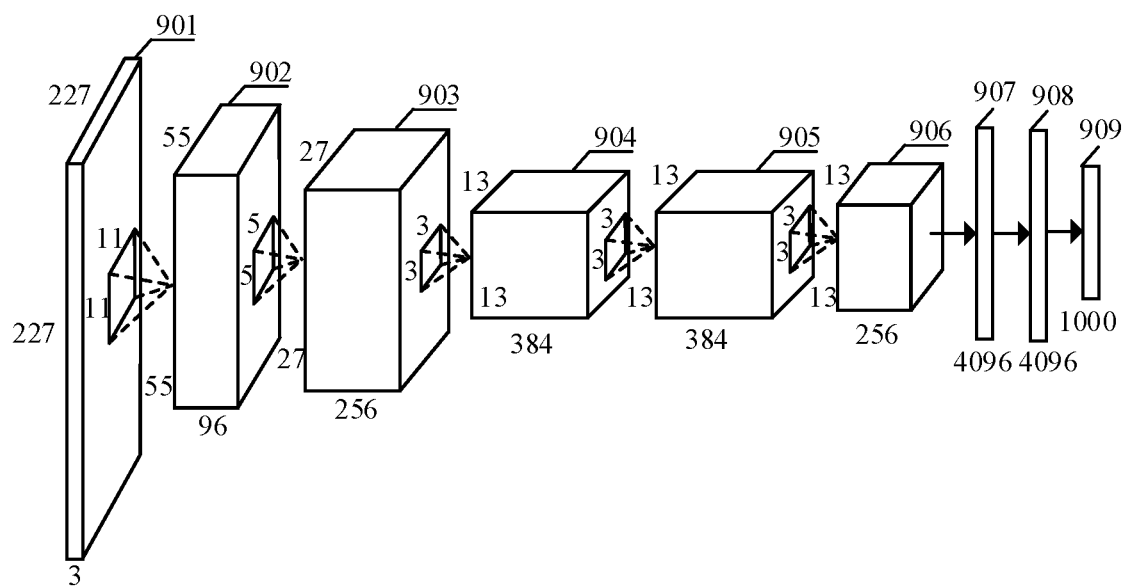
FIG. 9 is a schematic structural diagram of AlexNet according to an embodiment of this application.

In this application, a secondary convolution kernel obtained based on a primary convolution kernel may be used for any convolutional neural network. Using AlexNet as an example, the following describes how to use a secondary convolution kernel in a process of implementing image classification by using a CNN. FIG. 9 is a schematic structural diagram of AlexNet according to an embodiment of this application. As shown in FIG. 9, AlexNet includes five convolution layers and three fully connected layers. 901 to 905 are input image information of a first convolution layer to a fifth convolution layer sequentially. 902 to 906 are output feature graphs of the first convolution layer to the fifth convolution layer sequentially. 907 to 909 are three fully connected layers. It can be learned from FIG. 9 that sizes of sliding windows (two-dimensional matrices on all channels of convolution kernels) of the first convolution layer to the fifth convolution layer are 11×11, 5×5, 3×3, 3×3, and 3×3 respectively. Quantities of input channels (quantities of channels of input image information) of the first convolution layer to the fifth convolution layer are 3, 96, 256, 384, and 384 respectively. Quantities of output channels (quantities of channels of output feature graphs) are 96, 256, 384, 384, and 256 respectively. It may be understood that a convolution kernel used at the first convolution layer is an (11×11×3) three-dimensional matrix, a convolution kernel used at a second convolution layer is a (5×5×96) three-dimensional matrix, and so on. A size of a convolution kernel of each convolution layer may be determined. AlexNet in FIG. 9 may further include a pooling layer. Because a main application point of this application lies in a convolution layer, the pooling layer is not described in detail herein.

Use of a spatial secondary convolution kernel: The use of a spatial secondary convolution kernel is described by using the first convolution layer as an example. The image processing apparatus can obtain six spatial secondary convolution kernels with different sizes: 11×11×3, 9×9×3, 7×7×3, 5×5×3, 3×3×3, 1×1×31, by performing spatial sampling on the (11×11×3) primary convolution kernel. All parameters of the spatial secondary convolution kernels come from the primary convolution kernel. The quantity of output channels of the first convolution layer in AlexNet is 96. Therefore, to keep quantities of channels consistent, a quantity of output channels of the (11×11×3) primary convolution kernel is 16. In other words, a quantity of output channels of feature graphs obtained based on the primary convolution kernel is 16. In this way, a quantity of output channels of each of the six spatial secondary convolution kernels obtained based on the primary convolution kernel is also 16. Six output feature graphs obtained based on the six spatial secondary convolution kernels are spliced. A quantity of output channels of a finally obtained feature graph is 16×6=96. In this case, a parameter amount of the spatial secondary convolution kernels of the convolution layer is (11×11×3×16=5808). However, a parameter amount of the convolution layer in the original AlexNet is (11×11×3×96=34848). The parameter amount is reduced by 34848/5808=6 times. A calculation speed increases by (11×11×6)/(11×11+9×9+7×7+5×5+3×3+1×1)=2.54 times. An operation for another convolution layer is similar.

Use of a channel secondary convolution kernel: The use of a channel secondary convolution kernel is described by using the second convolution layer including 96 input channels as an example. If a sampling stride is set to 1, and a quantity of channels of a channel secondary convolution kernel is set to 93, the image processing apparatus performs sampling on a channel of a primary convolution kernel, to obtain four channel secondary convolution kernels that each include 93 input channels. The quantity of output channels of the second convolution layer in AlexNet is 256. Therefore, to keep quantities of channels consistent, a quantity of output channels of the primary convolution kernel is 64. In this way, a quantity of output channels of each of the four obtained channel secondary convolution kernels is also 64. Four output feature graphs obtained based on the four channel secondary convolution kernels are spliced. A quantity of output channels of a finally obtained feature graph is 64×4=256. In this case, a parameter amount of the channel secondary convolution kernels of the convolution layer is 5×5×96×64=153600. However, a parameter amount of the convolution layer in the original AlexNet is 5×5×96×256=614400. The parameter amount is reduced by 614400/153600=4 times. An operation for another convolution layer is similar.

The method in this embodiment of this application is applicable to all CNN structures. For a network other than AlexNet, for example, ResNet-50 or ResNeXt-50, an original convolution kernel may be replaced with a secondary convolution kernel in a manner similar to the aforementioned manners, to achieve an effect of reducing a parameter amount of the network and improving a calculation speed.

The foregoing embodiments describe how to use a secondary convolution kernel in a process of implementing image classification by using a CNN. The following describes an image classification effect achieved by using the image processing method provided in this embodiment of this application.

An image classification test experiment is performed on an ImageNet dataset by using an algorithm proposed in this application. Table 2 shows experiment results obtained after a secondary convolution kernel proposed in this application is used in several convolutional neural networks (AlexNet, ResNet-50, and ResNeXt-50). In the experiment, structures (a quantity of layers, a size of a convolution kernel of each layer, a parameter, and the like) of these neural network models are not changed, but a quantity of convolution kernels of each layer is merely reduced according to a calculation manner of the secondary convolution kernel proposed in this application.

TABLE 2

| Network | Parameter amount | Occupied memory | Quantity of times of calculation | Top 1 error rate | Top 5 error rate |
|---|---|---|---|---|---|
| AlexNet | $6.1 \times 10^7$ | 232.5 MB | $0.7 \times 10^9$ | 42.9% | 19.8% |
| Versatile-AlexNet | $3.5 \times 10^7$ | 131.8 MB | $0.4 \times 10^9$ | 42.1% | 19.5% |
| Versatile v2-AlexNet | $1.9 \times 10^7$ | 73.7 MB | $0.4 \times 10^9$ | 44.1% | 20.7% |
| ResNet-50 | $2.6 \times 10^7$ | 97.2 MB | $4.1 \times 10^9$ | 24.7% | 7.8% |
| Versatile-ResNet-50 | $1.9 \times 10^7$ | 75.6 MB | $3.2 \times 10^9$ | 24.5% | 7.6% |
| Versatile v2-ResNet-50 | $1.1 \times 10^7$ | 41.7 MB | $3.0 \times 10^9$ | 25.5% | 8.2% |
| ResNeXt-50 | $2.5 \times 10^7$ | 95.3 MB | $4.2 \times 10^9$ | 22.6% | 6.5% |
| Versatile v2-ResNeXt-50 | $1.3 \times 10^7$ | 50.0 MB | $4.0 \times 10^9$ | 23.8% | 7.0% |

Table 2 shows a parameter amount, occupied memory, a quantity of times of floating-point calculation, and accuracy obtained when image classification experiments are performed on an ImageNet dataset in a plurality of convolutional neural networks. In Table 2, Versatile-AlexNet represents AlexNet in which a spatial secondary convolution kernel is used, Versatile v2-AlexNet represents AlexNet in which a spatial secondary convolution kernel and a channel secondary convolution kernel are used, Versatile-ResNet-50 represents ResNet-50 in which a spatial secondary convolution kernel is used, Versatile v2-ResNet-50 represents ResNet-50 in which a spatial secondary convolution kernel and a channel secondary convolution kernel are used, and Versatile v2-ResNeXt-50 represents ResNeXt-50 in which a spatial secondary convolution kernel and a channel secondary convolution kernel are used. It can be learned from FIG. 2 that, after a traditional convolution kernel in an existing convolutional neural network is replaced with the secondary convolution kernel proposed in this application, a parameter amount of a convolutional neural network is greatly reduced, occupied memory and a calculation amount are also reduced, and impact on an image classification result is quite small. Further, traditional convolution kernels in some lightweight deep convolutional neural networks (for example, ShuffleNet) are placed with the secondary convolution kernel proposed in this application, and training is performed on the ImageNet dataset. This can verify whether it is effective to apply the secondary convolution kernel proposed in this application to a lightweight deep convolutional neural network.

TABLE 3

| Network | Parameter amount | Occupied memory | Quantity of times of calculation | Top 1 error rate |
|---|---|---|---|---|
| ShuffleNet | $0.7 \times 10^7$ | 20.6 MB | $0.5 \times 10^9$ | 26.3% |
| Versatile v2-ShuffleNet | $0.4 \times 10^7$ | 14.0 MB | $0.5 \times 10^9$ | 27.6% |

Sizes of most convolution kernels in ShuffleNet are 1×1. It can be learned from FIG. 3 that memory overheads of ShuffleNet can be reduced by over 30% by applying the secondary convolution kernel proposed in this application, and impact on image classification accuracy is quite small.

In addition to an image classification task, the secondary convolution kernel proposed in this application may be further applied to another image processing task. Processing an image super-resolution task is used as an example. Massive convolution needs to be performed when a VDSR (Very Deep CNN for Image Super-resolution) network is used to perform an image super-resolution task. A traditional convolution kernel in the VDSR network may be replaced with a secondary convolution kernel in this application. A replacement manner is similar to that of AlexNet. The VDSR network is an image super-resolution CNN model published in the CVPR 2016. CVPR is short for IEEE conference on computer vision and pattern recognition. A specific experiment result on standard super-resolution dataset is shown in Table 4.

TABLE 4

| Network | Occupied memory | Quantity of times of calculation | PSNR (×2) | PSNR (×4) |
|---|---|---|---|---|
| VDSR | 2.82 MB | $48.39 \times 10^9$ | 37.53 dB | 31.35 dB |
| Versatile-VDSR | 1.41 MB | $26.90 \times 10^9$ | 37.64 dB | 31.41 dB |
| Versatile v2-VDSR | 0.69 MB | $26.46 \times 10^9$ | 37.58 dB | 31.37 dB |

In Table 4, Versatile-VDSR represents a VDSR network in which a spatial secondary convolution kernel is used, and Versatile v2-VDSR represents a VDSR network in which a spatial secondary convolution kernel and a channel secondary convolution kernel are used. The PSNR is a peak signal-to-noise ratio. The PSNR (×4) represents a peak signal-to-noise ratio obtained after an image obtained through image super-resolution processing is enlarged fourfold. The PSNR (×2) represents a peak signal-to-noise ratio obtained after an image obtained through image super-resolution processing is enlarged twofold. It can be learned from Table 4 that, by using the secondary convolution kernel proposed in this application, a super-resolution effect can be kept and even improved while achieving objectives of model compression and acceleration.

The foregoing embodiments describe the image processing method and the training method. The following describes structures of a training device and an image processing apparatus that implement the methods.

Figure 10:
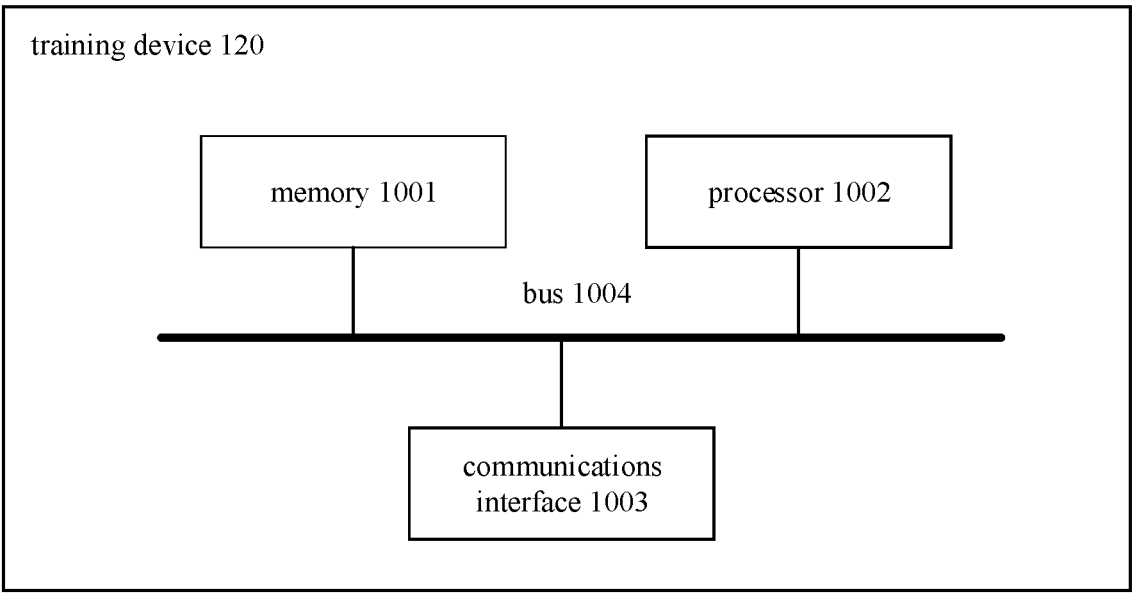
FIG. 10 is a schematic diagram of a hardware structure of a convolutional neural network training device according to an embodiment of this application.

FIG. 10 is a schematic diagram of a hardware structure of a convolutional neural network training device according to an embodiment of this application. The training device 120 (the training device 120 may be specifically a computer device) shown in FIG. 10 includes a memory 1001, a processor 1002, a communications interface 1003, and a bus 1004. Communication connections between the memory 1001, the processor 1002, and the communications interface 1003 are implemented by using the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the processor 1002 and the communications interface 1003 are configured to perform the steps of the convolutional neural network training method in the embodiments of this application.

The processor 1002 may be a general purpose central processing unit, a microprocessor, an application-specific integrated circuit (ASIC), a graphics processing unit (GPU), or one or more integrated circuits, and is configured to execute a related program, so as to implement functions that need to be performed by the units in the convolutional neural network training device in this embodiment of this application, or perform the convolutional neural network training method in the method embodiments of this application.

Alternatively, the processor 1002 may be an integrated circuit chip and has a signal processing capability. In an implementation process, the steps of the convolutional neural network training method in this application may be performed by using an integrated logic circuit of hardware of the processor 1002 or an instruction in a software form. Alternatively, the processor 1002 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 1002 may implement or execute the methods, the steps, and the logical block diagrams disclosed in the embodiments of this application. The general purpose processor may be a microprocessor, or the processor may be any conventional processor or the like. The steps of the methods disclosed in the embodiments of this application may be directly performed by a hardware decoding processor, or may be performed by a combination of hardware of a decoding processor and a software module. The software module may be located in a mature storage medium in the art, such as a random access memory, a flash memory, a read-only memory, a programmable read-only memory or an electrically erasable programmable memory, or a register. The storage medium is located in the memory 1001. The processor 1002 reads information from the memory 1001, and in combination with hardware of the processor 1002, performs functions that need to be performed by the units included in the convolutional neural network training device in this embodiment of this application, or perform the convolutional neural network training method in the method embodiments of this application.

A transceiver apparatus such as, but not limited to, a transceiver is used at the communications interface 1003, to implement communication between the training device 1000 and another device or a communications network. For example, training data (for example, the input image in Embodiment 1 of this application) may be obtained by using the communications interface 1003.

The bus 1004 may include a channel that transmits information between various parts (for example, the memory 1001, the processor 1002, and the communications interface 1003) of the training device 120.

Figure 11:
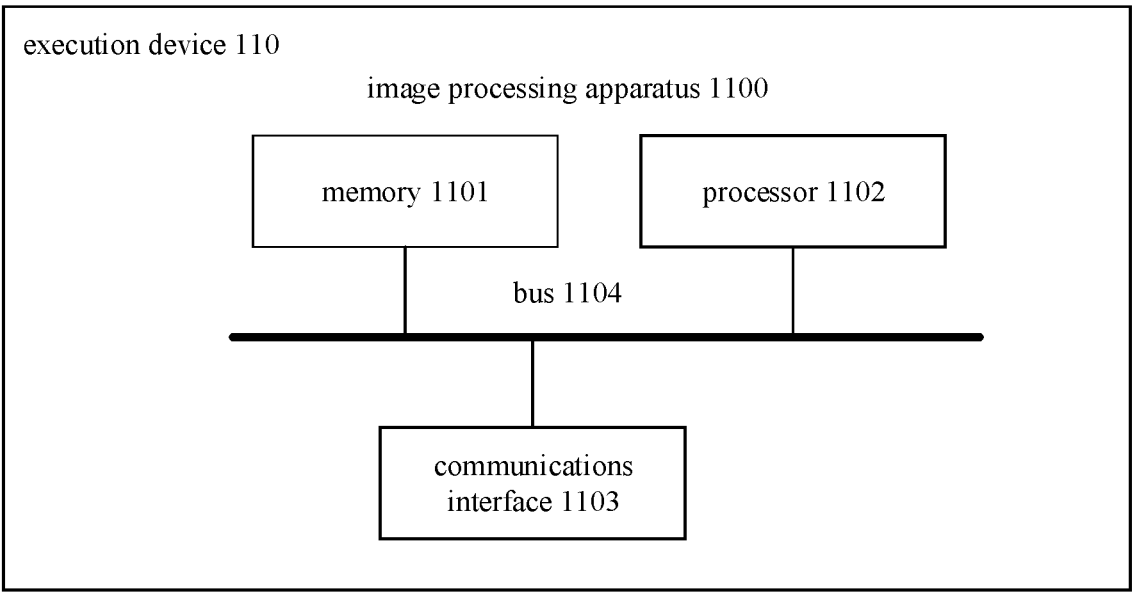
FIG. 11 is a schematic diagram of a hardware structure of an image processing apparatus according to an embodiment of this application.

FIG. 11 is a schematic diagram of a hardware structure of an image processing apparatus according to an embodiment of this application. The image processing apparatus 1100 (the apparatus 1100 may be specifically a computer device, such as the execution device 110 shown in FIG. 1) shown in FIG. 11 includes a memory 1101, a processor 1102, a communications interface 1103, and a bus 1104. Communication connections between the memory 1101, the processor 1102, and the communications interface 1103 are implemented by using the bus 1104.

The memory 1101 may be a read-only memory (ROM), a static storage device, a dynamic storage device, or a random access memory (RAM). The memory 1101 may store a program. When the program stored in the memory 1101 is executed by the processor 1102, the processor 1102 and the communications interface 1103 are configured to perform the steps of the convolutional neural network-based image processing method in the embodiments of this application.

The processor 1102 may be a general purpose central processing unit, a microprocessor, an application-specific integrated circuit, a graphics processing unit, or one or more integrated circuits, and is configured to execute a related program, so as to implement functions that need to be performed by the image processing apparatus in this embodiment of this application, or perform the image processing method in the method embodiments of this application.

Alternatively, the processor 1102 may be an integrated circuit chip and has a signal processing capability. In an implementation process, the steps of the convolutional neural network-based image processing method in this application may be performed by using an integrated logic circuit of hardware of the processor 1102 or an instruction in a software form. Alternatively, the processor 1102 may be a general purpose processor, a digital signal processor, an application-specific integrated circuit, a field programmable gate array or another programmable logic device, a discrete gate or a transistor logic device, or a discrete hardware component. The processor 1102 may implement or execute the methods, the steps, and the logical block diagrams disclosed in the embodiments of this application. The general purpose processor may be a microprocessor, or the processor may be any conventional processor or the like. The steps of the methods disclosed in the embodiments of this application may be directly performed by a hardware decoding processor, or may be performed by a combination of hardware of a decoding processor and a software module. The software module may be located in a mature storage medium in the art, such as a random access memory, a flash memory, a read-only memory, a programmable read-only memory or an electrically erasable programmable memory, or a register. The storage medium is located in the memory 1101. The processor 1102 reads information from the memory 1101, and in combination with hardware of the processor 1102, performs functions that need to be performed by the units included in the image processing apparatus in this embodiment of this application, or perform the convolutional neural network-based image processing method in the method embodiments of this application.

A transceiver apparatus such as, but not limited to, a transceiver is used at the communications interface 1103, to implement communication between the apparatus 1100 and another device or a communications network. For example, training data (for example, the input image in Embodiment 2 of this application) may be obtained by using the communications interface 1103.

The bus 1104 may include a channel that transmits information between various parts (for example, the memory 1101, the processor 1102, and the communications interface 1103) of the image processing apparatus 1100.

It should be noted that the training device 120 and the execution device 110 (the image processing apparatus 1100) shown in FIG. 10 and FIG. 11 show merely a memory, a processor, and a communications interface. However, in a specific implementation process, a person skilled in the art should understand that the training device 120 and the execution device 110 further include other devices required for normal running. In addition, according to a specific requirement, a person skilled in the art should understand that the training device 120 and the execution device 110 may further include a hardware device for implementing another additional function. In addition, a person skilled in the art should understand that the training device 120 and the execution device 110 may include only a device required for implementing the embodiments of this application, and do not need to include all the devices shown in FIG. 10 or FIG. 11.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A convolutional neural network-based image processing method, comprising:
   receiving an input image;
   preprocessing the input image to obtain preprocessed image information;
   performing convolution on the image information using a convolutional neural network, wherein the convolutional neural network comprises N convolution layers, and performing convolution comprises: performing a convolution operation on the image information using M convolution kernels at an $n^{th}$ convolution layer, wherein:
      the M convolution kernels comprise m primary convolution kernels and r secondary convolution kernels,
      the r secondary convolution kernels are obtained based on the m primary convolution kernels,
      one or more secondary convolution kernels are correspondingly obtained based on one primary convolution kernel,
      a quantity of non-zero elements comprised in each of the r secondary convolution kernels is less than a quantity of non-zero elements comprised in a primary convolution kernel corresponding to the secondary convolution kernel,
      both N and M are integers greater than 0,
      n is an integer greater than 0 and less than or equal to N,
      m is an integer greater than 0 and less than M, and
      r is an integer greater than 0 and less than M; and
   outputting a convolution result, wherein the convolution result comprises M feature graphs.

2. The method according to claim 1, wherein:
   any one of the r secondary convolution kernels comprises P channels;
   a primary convolution kernel corresponding to the any secondary convolution kernel comprises P channels;
   a two-dimensional matrix, on a $p^{th}$ channel, of the any secondary convolution kernel comprises a sub-matrix of a two-dimensional matrix, on a $p^{th}$ channel, of the primary convolution kernel corresponding to the any secondary convolution kernel;
   P is an integer greater than 0; and
   p is an integer greater than 0 and not greater than P.

3. The method according to claim 2, wherein:
   an element comprised in the two-dimensional matrix, on the $p^{th}$ channel, of the any secondary convolution kernel is an element other than elements in outermost K rows and outermost K columns in the two-dimensional matrix, on the $p^{th}$ channel, of the primary convolution kernel corresponding to the any secondary convolution kernel; and
   K is an integer not less than 1.

4. The method according to claim 1, wherein:
   any one of the r secondary convolution kernels comprises P channels;
   the any secondary convolution kernel comprises a two-dimensional matrix on P contiguous channels of Q channels comprised in a primary convolution kernel corresponding to the any secondary convolution kernel;
   both P and Q are integers greater than 0; and
   P is less than Q.

5. The method according to claim 1, wherein:
   s secondary convolution kernels of the r secondary convolution kernels are obtained based on any one of the m primary convolution kernels; s is an integer greater than or equal to 1;
   before the performing convolution on the image information by using a convolutional neural network, the method further comprises: training the convolutional neural network; and training the convolutional neural network comprises:
      performing convolution on a training sample by using the convolutional neural network, to obtain a convolution result;
      separately calculating gradients of the s secondary convolution kernels based on the convolution result; and
      updating an element in the any primary convolution kernel based on a gradient of the any primary convolution kernel, wherein the gradient of the any primary convolution kernel is a sum of the gradients of the s secondary convolution kernels.

6. A non-transitory computer-readable storage medium coupled to at least one processor and storing programming instructions for execution by the at least one processor, wherein the programming instructions instruct the at least one processor to perform the method according to claim 1.

7. A chip, wherein the chip comprises:
   at least one processor; and
   a data interface, and the at least one processor performs the method according to claim 1 by reading, through the data interface, programming instructions stored in a non-transitory computer-readable storage medium coupled to the at least one processor.

8. An electronic device, comprising:
   at least one processor; and
   a non-transitory computer-readable storage medium coupled to the at least one processor and storing programming instructions for execution by the at least one processor, wherein the programming instructions instruct the at least one processor to perform operations comprising:

receiving an input image;

preprocessing the input image, to obtain preprocessed image information;

performing convolution on the image information using a convolutional neural network, wherein the convolutional neural network comprises N convolution layers, and performing convolution comprises:

performing a convolution operation on the image information using M convolution kernels at an $n^{th}$ convolution layer, wherein:

the M convolution kernels comprise m primary convolution kernels and r secondary convolution kernels, the r secondary convolution kernels are obtained based on the m primary convolution kernels, one or more secondary convolution kernels are correspondingly obtained based on one primary convolution kernel, a quantity of non-zero elements comprised in each of the r secondary convolution kernels is less than a quantity of non-zero elements comprised in a primary convolution kernel corresponding to the secondary convolution kernel, both N and M are integers greater than 0, n is an integer greater than 0 and less than or equal to N, m is an integer greater than 0 and less than M, and r is an integer greater than 0 and less than M; and outputting a convolution result, wherein the convolution result comprises M feature graphs.

9. The electronic device according to claim 8, wherein:

any one of the secondary convolution kernel comprises P channels;

a primary convolution kernel corresponding to the any one of the secondary convolution kernel comprises P channels;

a two-dimensional matrix, on a $p^{th}$ channel, of the any one of the secondary convolution kernel comprises a sub-matrix of a two-dimensional matrix, on a $p^{th}$ channel, of the primary convolution kernel corresponding to the any one of the secondary convolution kernel;

P is an integer greater than 0; and p is an integer greater than 0 and not greater than P.

10. The electronic device according to claim 9, wherein:

an element comprised in the two-dimensional matrix, on the $p^{th}$ channel, of the any one of the secondary convolution kernel is an element other than elements in outermost K rows and outermost K columns in the two-dimensional matrix, on the $p^{th}$ channel, of the primary convolution kernel corresponding to the any one of the secondary convolution kernel; and K is an integer not less than 1.

11. The electronic device according to claim 8, wherein:

any one of the secondary convolution kernel comprises P channels;

the any one of the secondary convolution kernel comprises a two-dimensional matrix on P contiguous channels of Q channels comprised in a primary convolution kernel corresponding to the any one of the secondary convolution kernel;

both P and Q are integers greater than 0; and

P is less than Q.

12. The electronic device according to claim 8, wherein:

s secondary convolution kernels of the r secondary convolution kernels are obtained based on any one of the m primary convolution kernels;

s is an integer greater than or equal to 1;

the programming instructions instruct the at least one processor to train the convolutional neural network by operations comprising:

performing convolution on a training sample using the convolutional neural network, to obtain a convolution result;

separately calculating gradients of the s secondary convolution kernels based on the convolution result; and updating an element in the any primary convolution kernel based on a gradient of the any primary convolution kernel, wherein the gradient of the any primary convolution kernel is a sum of the gradients of the s secondary convolution kernels.

\* \* \* \* \*

UNITED STATES PATENT AND TRADEMARK OFFICE
CERTIFICATE OF CORRECTION

PATENT NO. : 10,891,537 B2  
APPLICATION NO. : 16/359346  
DATED : January 12, 2021  
INVENTOR(S) : Wang et al.

It is certified that error appears in the above-identified patent and that said Letters Patent is hereby corrected as shown below:

On the Title Page

Page 2, item (56) Other Publications, Citation 9: "[cs.CV], total 10 ppages (Mar. 12, 2019)." should read -- [cs.CV], total 10 pages (Mar. 12, 2019). --.

Signed and Sealed this  
Twenty-eighth Day of June, 2022

Katherine Kelly Vidal  
*Director of the United States Patent and Trademark Office*